United States Patent
Yamamoto et al.

(10) Patent No.: US 12,192,914 B2
(45) Date of Patent: *Jan. 7, 2025

(54) TERMINAL AND COMMUNICATION METHOD FOR UPLINK CONTROL CHANNEL TRANSMISSION

(71) Applicant: Panasonic Intellectual Property Corporation of America, Torrance, CA (US)

(72) Inventors: Tetsuya Yamamoto, Kanagawa (JP); Hidetoshi Suzuki, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 313 days.

This patent is subject to a terminal disclaimer.

(21) Appl. No.: 17/746,676

(22) Filed: May 17, 2022

(65) Prior Publication Data

US 2022/0279459 A1 Sep. 1, 2022

Related U.S. Application Data

(63) Continuation of application No. 16/490,587, filed as application No. PCT/JP2018/002724 on Jan. 29, 2018, now Pat. No. 11,368,921.

(30) Foreign Application Priority Data

Mar. 23, 2017 (JP) .................................. 2017-057807

(51) Int. Cl.
*H04W 52/24* (2009.01)
*H04L 5/00* (2006.01)
(Continued)

(52) U.S. Cl.
CPC ......... *H04W 52/241* (2013.01); *H04L 5/0082* (2013.01); *H04W 52/146* (2013.01);
(Continued)

(58) Field of Classification Search
CPC ............. H04W 52/241; H04W 52/146; H04W 72/0446; H04W 72/0453; H04W 72/21;
(Continued)

(56) References Cited

U.S. PATENT DOCUMENTS

2008/0153425 A1* 6/2008 Heo ........................ H04L 1/001
455/68
2013/0281148 A1 10/2013 Seyama
(Continued)

FOREIGN PATENT DOCUMENTS

WO 2012/090327 A1 7/2012
WO 2016/121457 A1 8/2016

OTHER PUBLICATIONS

Panasonic, "Discussion, on UCI and data multiplexing for uplink control channel[online]", 3GPP TSG RAN WG1 #88 R1-1702302, Internet<URL:http://www.3gpp.org/ftp/tsg_ran/WG1_RL1/TSGR1_88/Docs/R1-1702302.zip>, Feb. 6, 2017.
(Continued)

*Primary Examiner* — Walli Z Butt
(74) *Attorney, Agent, or Firm* — Seed IP Law Group LLP

(57) ABSTRACT

In a terminal, in a slot having allocated thereto both an uplink control channel (PUCCH) and an uplink channel (PUSCH) that includes uplink data, in a case where the difference between the power spectrum density (PSD) of the PUCCH and the PSD of the PUSCH is greater than a threshold value (permitted difference), a control unit drops symbols of the PUSCH in a transmission interval for the
(Continued)

PUSCH overlapping with a transmission interval for the PUCCH. A transmission unit transmits at least the PUCCH in the slot.

13 Claims, 20 Drawing Sheets

(51) Int. Cl.
　　*H04W 52/14*　　　(2009.01)
　　*H04W 72/0446*　　(2023.01)
　　*H04W 72/0453*　　(2023.01)
　　*H04W 72/21*　　　(2023.01)
(52) U.S. Cl.
　　CPC ... *H04W 72/0446* (2013.01); *H04W 72/0453* (2013.01); *H04W 72/21* (2023.01)
(58) Field of Classification Search
　　CPC .............. H04W 52/325; H04W 52/365; H04L 5/0082; H04L 1/1861; H04L 1/0006; H04L 5/003; H04L 5/0044; H04L 5/0048; H04L 5/0053; H04L 5/0055
　　See application file for complete search history.

(56) References Cited

U.S. PATENT DOCUMENTS

| | | | |
|---|---|---|---|
| 2018/0020429 A1 | 1/2018 | Aiba et al. | |
| 2018/0123744 A1* | 5/2018 | Nogami | H04W 52/248 |
| 2018/0132229 A1* | 5/2018 | Li | H04L 5/0053 |
| 2018/0206196 A1* | 7/2018 | Wang | H04W 52/343 |

OTHER PUBLICATIONS

International Search Report of PCT application No. PCT/JP2018/002724 dated Mar. 27, 2018.

3GPP TS 36.211 V13.4.0, "3rd Generation Partnership Project; Technical Specification Group Radio Access Network; Evolved Universal Terrestrial Radio Access (E-UTRA); Physical channels and modulation (Release 13)", Dec. 2016.

3GPP TS 36.212 V13.4.0, "3rd Generation Partnership Project; Technical Specification Group Radio Access Network; Evolved Universal Terrestrial Radio Access (E-UTRA); Multiplexing and channel coding (Release 13)", Dec. 2016.

3GPP TS 36.213 V13.4.0, "3rd Generation Partnership Project; Technical Specification Group Radio Access Network; Evolved Universal Terrestrial Radio Access (E-UTRA); Physical layer procedures (Release 13)", Dec. 2016.

3GPP TSG RAN WG1 Meeting #87, "RAN1 Chairman's Notes", Nov. 2016.

3GPP TSG RAN WG1 Meeting NR Ad-Hoc Spokane, "RAN1 Chairman's Notes", Jan. 2017.

3GPP TSG RAN WG1 NR Ad-Hoc Meeting Spokane, R1-1700174, "Discussion on multiplexing of short PUCCH and UL data", Jan. 2017.

3GPP TSG RAN WG1 Meeting #87, R1-1612140, "Multiplexing of PUCCH and other channels", Nov. 2016.

* cited by examiner

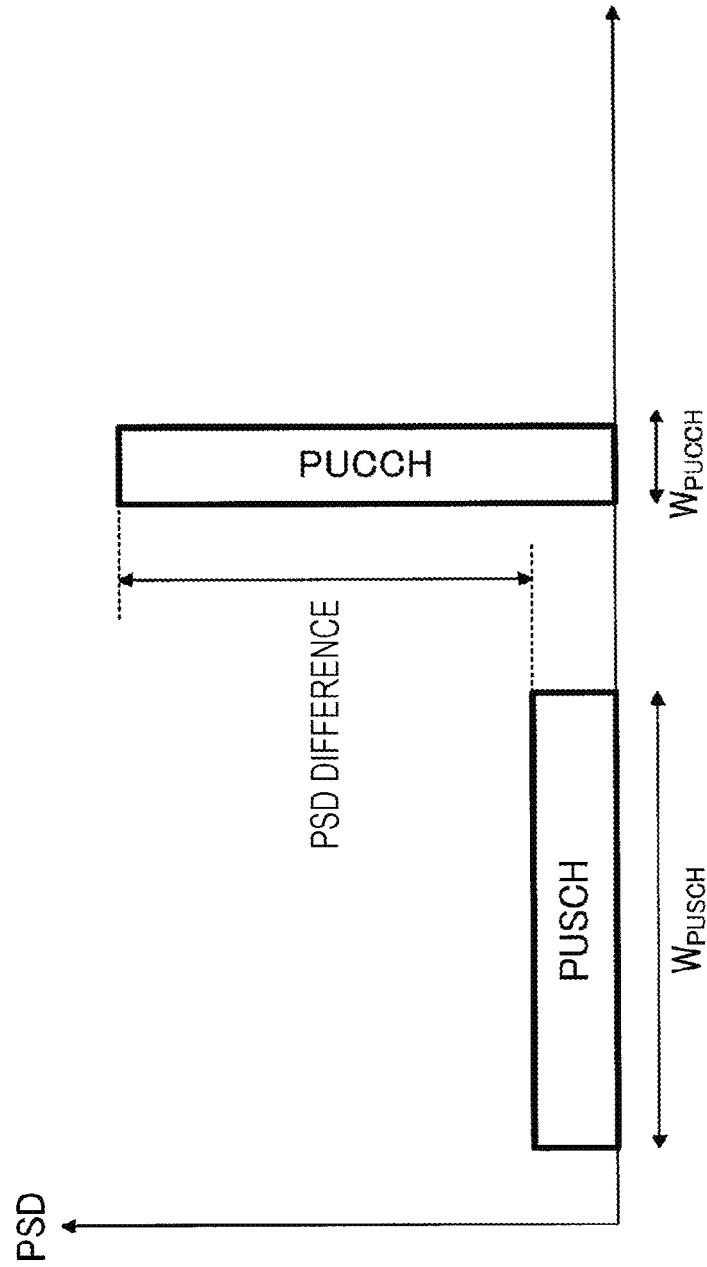

Case 1-1

Case 1-2

Case 2-1

Case 2-2

Case 3-1

Case 3-2

Case 4-1

Case 4-2

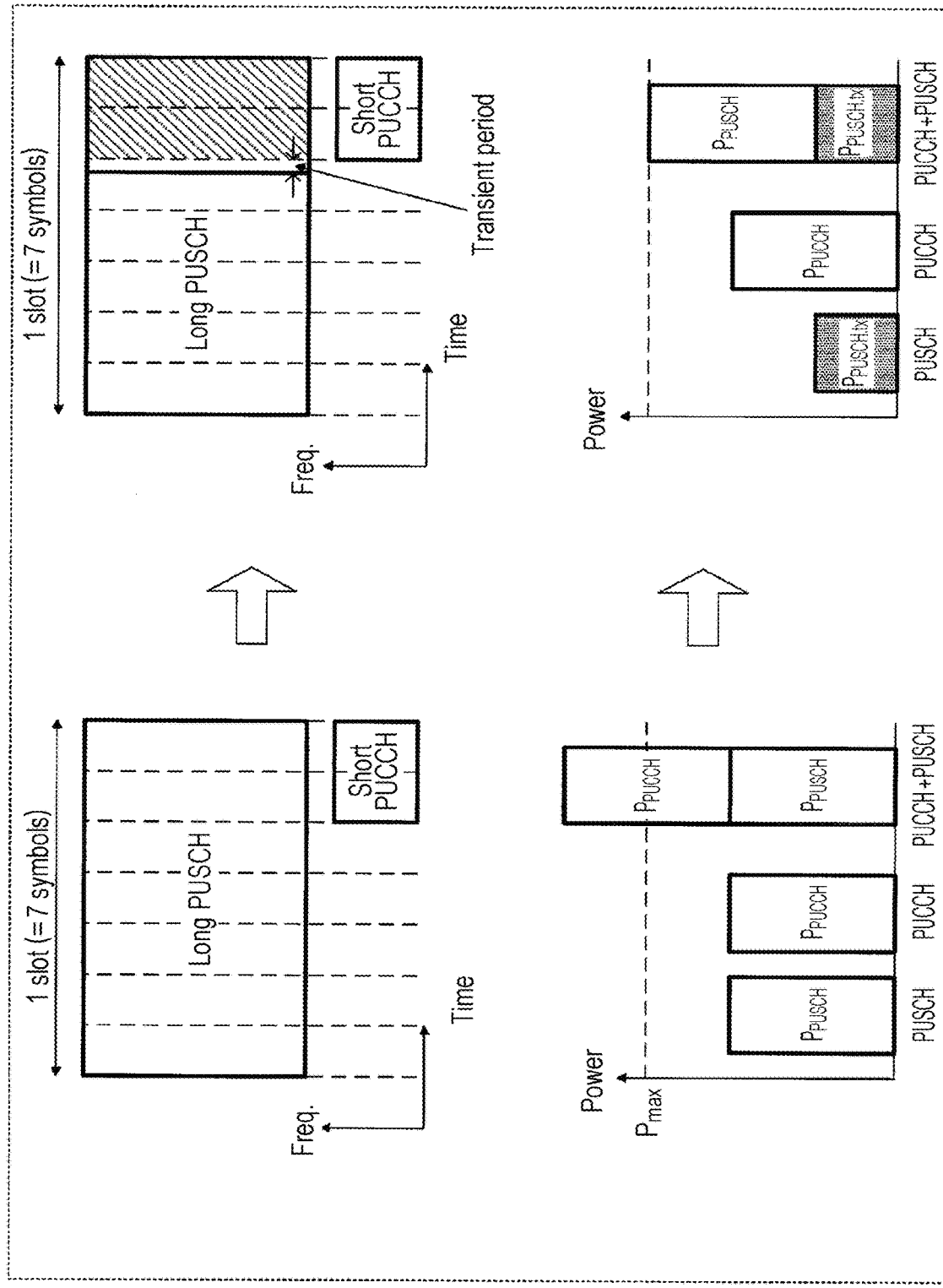

TERMINAL AND COMMUNICATION METHOD FOR UPLINK CONTROL CHANNEL TRANSMISSION

TECHNICAL FIELD

The present disclosure relates to a terminal and a communication method.

BACKGROUND ART

With the spread of services using mobile broadband in recent years, data traffic in mobile communication has continued to increase exponentially, and looking forward there is a pressing need to expand data transmission capacities. Furthermore, in the future, dramatic developments are anticipated for the IoT (Internet of Things) in which all "things" are connected via the Internet. To support the diversification of services by means of the IoT, dramatic advancements are needed not only for data transmission capacity but also for various requirements such as low latency and communication area (coverage). With this background, progress is being made in the technical development/standardization of the fifth-generation mobile communication system (5G), which considerably improves performance and function compared to the fourth-generation mobile communication system (4G).

In the 3GPP (3rd Generation Partnership Project), in the standardization of 5G, progress is being made in the technical development of new radio access technology (NR: new RAT) that does not always have backward compatibility with LTE (Long Term Evolution)-Advanced.

In NR, similar to LTE, consideration is being given to a terminal (UE: user equipment) transmitting a response signal (ACK/NACK: acknowledgment/negative acknowledgment) indicating an error detection result for downlink data, channel state information (CSI) for a downlink, and a radio resource allocation request (SR: scheduling request) for an uplink, to a base station (eNB or gNB) using an uplink control channel (PUCCH: physical uplink control channel).

Furthermore, in NR, a terminal is able to carry out a PUCCH-PUSCH simultaneous transmission (a simultaneous PUCCH and PUSCH) in which a PUCCH and an uplink channel (PUSCH: physical uplink shared channel) for transmitting data are transmitted at the same time and in the same slot (see NPL 4 and 5).

CITATION LIST

Non Patent Literature

NPL 1: 3GPP TS 36.211 V13.4.0, "Evolved Universal Terrestrial Radio Access (E-UTRA); Physical Channels and Modulation (Release 13)", December 2016.
NPL 2: 3GPP TS 36.213 V13.4.0, "Evolved Universal Terrestrial Radio Access (E-UTRA); Physical Layer Procedures (Release 13)", December 2016.
NPL 3: 3GPP TS 36.211 V13.4.0, "Evolved Universal Terrestrial Radio Access (E-UTRA); Physical Channels and Modulation (Release 13)", December 2016.
NPL 4: Chairman's note, RAN1 #87, November 2016.
NPL 5: Chairman's note, RAN1 NR #NR Adhoc (Spokane's meeting), January 2017.
NPL 6: R1-1700174, "Discussion on Multiplexing of Short PUCCH and UL Data", MediaTek, January 2017.

SUMMARY OF INVENTION

With a PUCCH-PUSCH simultaneous transmission, there are cases where the power spectrum density (PSD) is different between the PUCCH and PUSCH. If the difference in the PSD between the PUCCH and PUSCH exceeds a limit (hereinafter referred to as the "permitted difference") for the performance of an RF (radio frequency) circuit provided in a terminal, distortion occurs in signals and the transmission quality deteriorates. In particular, in NR, consideration is being given to allocating frequencies of a wider band compared to LTE-Advanced to improve transmission speed. Therefore, in NR, the effect on transmission quality due to the permitted difference for PSD becomes more notable compared to LTE-Advanced.

An embodiment of the present disclosure facilitates providing a terminal and a communication method with which it is possible for a PUCCH-PUSCH simultaneous transmission to be carried out while preventing a deterioration in transmission quality due to the permitted difference for PSD.

A terminal according to an embodiment of the present disclosure is provided with: a circuit that, in a slot having allocated thereto both an uplink control channel (PUCCH) and an uplink channel (PUSCH) that includes uplink data, in a case where a difference between a power spectrum density (PSD) of the PUCCH and the PSD of the PUSCH is greater than a threshold value, drops a symbol of the PUSCH in a transmission interval for the PUSCH overlapping with a transmission interval for the PUCCH; and a transmitter that transmits at least the PUCCH in the slot.

A terminal according to an embodiment of the present disclosure is provided with: a circuit that, in a slot having allocated thereto both an uplink control channel (PUCCH) and an uplink channel (PUSCH) that includes uplink data, in a case where a difference between a power spectrum density (PSD) of the PUCCH and the PSD of the PUSCH is greater than a threshold value, drops a portion of resources of frequency resources to which the PUSCH is allocated in a transmission interval for the PUSCH overlapping with a transmission interval for the PUCCH; and a transmitter that transmits the PUCCH, and the PUSCH for which the portion of a frequency band has been dropped, in the slot.

A terminal according to an embodiment of the present disclosure is provided with: a circuit that, in a slot having allocated thereto both an uplink control channel (PUCCH) and an uplink channel (PUSCH) that includes uplink data, in a case where a difference between a power spectrum density (PSD) of the PUCCH and the PSD of the PUSCH is greater than a threshold value, changes a transmission format of the PUCCH; and a transmitter that transmits the PUCCH obtained after the transmission format has been changed, and the PUSCH, in the slot.

A communication method according to an embodiment of the present disclosure includes: in a slot having allocated thereto both an uplink control channel (PUCCH) and an uplink channel (PUSCH) that includes uplink data, in a case where a difference between a power spectrum density (PSD) of the PUCCH and the PSD of the PUSCH is greater than a threshold value, dropping a symbol of the PUSCH in a transmission interval for the PUSCH overlapping with a transmission interval for the PUCCH; and transmitting at least the PUCCH in the slot.

A communication method according to an embodiment of the present disclosure includes: in a slot having allocated thereto both an uplink control channel (PUCCH) and an uplink channel (PUSCH) that includes uplink data, in a case where a difference between a power spectrum density (PSD) of the PUCCH and the PSD of the PUSCH is greater than a threshold value, dropping a portion of resources of frequency resources to which the PUSCH is allocated in a transmission interval for the PUSCH overlapping with a transmission interval for the PUCCH; and transmitting the PUCCH, and the PUSCH for which the portion of a frequency band has been dropped, in the slot.

A communication method according to an embodiment of the present disclosure includes: in a slot having allocated thereto both an uplink control channel (PUCCH) and an uplink channel (PUSCH) that includes uplink data, in a case where a difference between a power spectrum density (PSD) of the PUCCH and the PSD of the PUSCH is greater than a threshold value, changing a transmission format of the PUCCH; and transmitting the PUCCH obtained after the transmission format has been changed, and the PUSCH, in the slot.

It should be noted that general or specific embodiments hereof may be realized by a system, a method, an integrated circuit, a computer program, or a recording medium, and may be realized by an arbitrary combination of a system, a device, a method, an integrated circuit, a computer program, and a recording medium.

According to an embodiment of the present disclosure, it is possible for a PUCCH-PUSCH simultaneous transmission to be carried out while preventing a deterioration in transmission quality due to the permitted difference for PSD.

Additional benefits and advantages in an embodiment of the present disclosure will be made apparent from the specification and drawings. The benefits and/or advantages may each be provided by several of the embodiments and the features disclosed in the specification and drawings, and need not all be provided in order to obtain one or more of the same features.

BRIEF DESCRIPTION OF DRAWINGS

FIG. 1 depicts an example of the PSD difference between a PUCCH and PUSCH.

FIG. 20 depicts an example of setting a transient period according to embodiment 4.

DESCRIPTION OF EMBODIMENTS

Figure 2A:
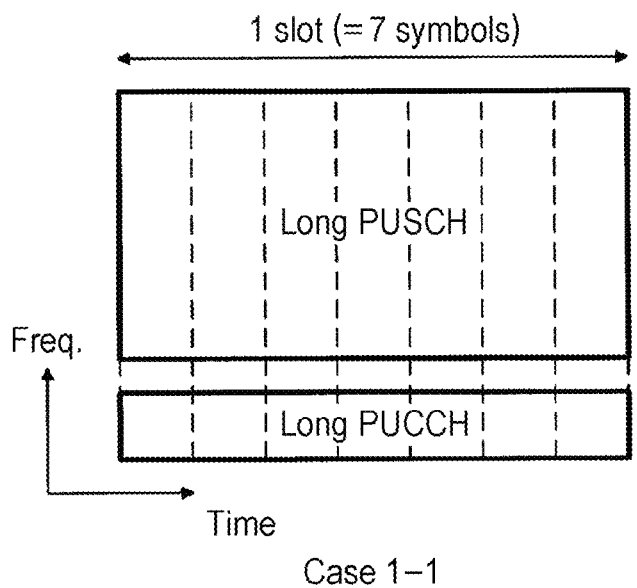
FIG. 2A depicts an example of a long PUCCH-long PUSCH simultaneous transmission (case 1-1).

Hereinafter, embodiments of the present disclosure will be described in detail with reference to the drawings.

A base station allocates a resource block (also referred to as an RB or PRB (physical RB)) for transmitting a PUCCH and PUSCH, with respect to each terminal. The terminals transmit a PUCCH and PUSCH using the RB allocated by the base station. At such time, it is assumed that the transmission bandwidths of the PUCCH and PUSCH are different. Specifically, it is typical for a PUSCH to have a wider transmission bandwidth than a PUCCH, as depicted in FIG. 1.

Generally, in radio communication, the PSD decreases as the occupied bandwidth widens, and the PSD increases as the occupied bandwidth narrows. Therefore, as depicted in FIG. 1, with a PUCCH-PUSCH simultaneous transmission, there are cases where the PSD is different between a PUCCH having a narrow transmission bandwidth (WPUCCH) and a PUSCH having a wide transmission bandwidth (WPUSCH).

A terminal has a limit (permitted difference) for the difference in the PSD of signals that are transmitted simultaneously, in accordance with the performance of the RF circuit provided in the terminal, or the like. In a terminal, in a case where signals for which the difference in PSD exceeds the permitted difference are transmitted at the same time, distortion occurs in the signals in the RF circuit, and transmission quality deteriorates.

In LTE-A, in the case of a PUCCH-PUSCH simultaneous transmission, transmission power has been controlled in consideration of the permitted value for the maximum transmission power of a terminal (for example, see NPL 3). However, in LTE-A, no consideration whatsoever is given to the effect of the permitted difference for PSD of signals that are transmitted simultaneously in a terminal.

As a method for avoiding a deterioration in transmission quality due to the permitted difference for PSD, it is feasible for a terminal to be provided with an RF circuit having a large permitted difference for PSD; however, there is an increase in the circuit scale of the terminal.

In addition, as mentioned above, in NR, consideration is being given to allocating frequencies of a wider band compared to LTE-A to improve transmission speed, and therefore the effect on transmission quality due to the permitted difference for PSD of a terminal becomes more notable compared to LTE-A.

Thus, in an embodiment of the present disclosure, a description will be given regarding a method for carrying out a PUCCH-PUSCH simultaneous transmission with a deterioration in transmission quality due to the permitted difference for PSD being prevented and without there being an increase in the circuit scale of the terminal, by controlling radio resources (time, frequency, and transmission power) for a PUCCH and PUSCH in consideration of the permitted difference for PSD.

Hereinafter, embodiments will be described in detail.

It should be noted that NR supports a "short PUCCH" in which a PUCCH is transmitted using one or two symbols within one slot, and a "long PUCCH" in which a PUCCH is transmitted using three or more symbols (for example, there may be four symbols as the minimum symbols).

Furthermore, NR supports a "short PUSCH" in which a PUSCH is allocated to a short UL interval (one or two symbols) within one slot, and a "long PUSCH" in which a PUSCH is allocated to a long UL interval within one slot (all symbols or most of the symbols within one slot).

In the embodiments, the following four cases (cases 1 to 4) obtained by combining each type of PUCCH and PUSCH (short or long) are assumed in relation to a PUCCH-PUSCH simultaneous transmission. It should be noted that, although an example in which one slot is configured of seven symbols is given hereinafter, the number of symbols constituting one slot is not restricted to seven symbols, and a slot may be configured of 14 symbols, for example.

[Case 1: Long PUCCH-Long PUSCH Simultaneous Transmission]

Figure 2B:
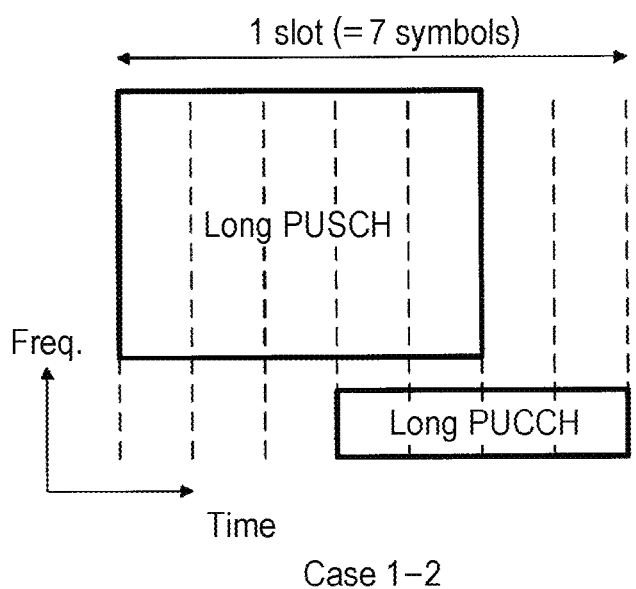
FIG. 2B depicts an example of a long PUCCH-long PUSCH simultaneous transmission (case 1-2).

In FIG. 2A, a case is assumed where a long PUCCH transmission interval and a long PUSCH transmission interval are completely overlapped (case 1-1). Furthermore, as depicted in FIG. 2B, a case is also assumed where the symbol lengths of a long PUCCH and a long PUSCH are different, that is, a case where a long PUCCH transmission interval and a long PUSCH transmission interval are partially overlapped (case 1-2).

[Case 2: Short PUCCH-Short PUSCH Simultaneous Transmission]

Figure 3A:
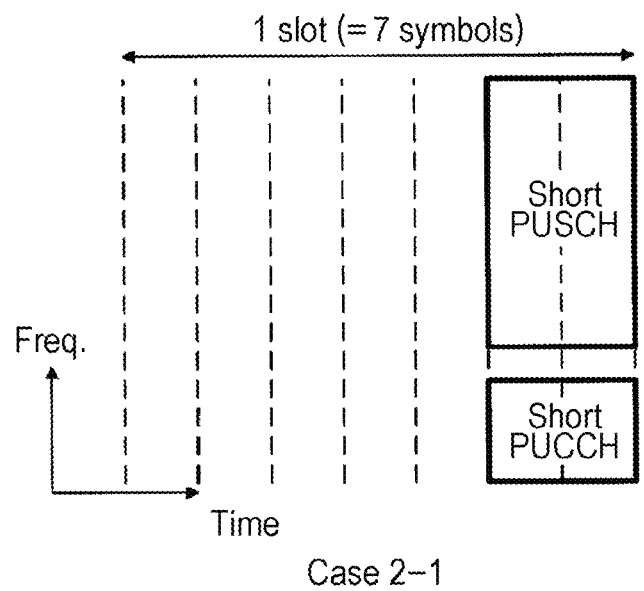
FIG. 3A depicts an example of a short PUCCH-short PUSCH simultaneous transmission (case 2-1).
Figure 3B:
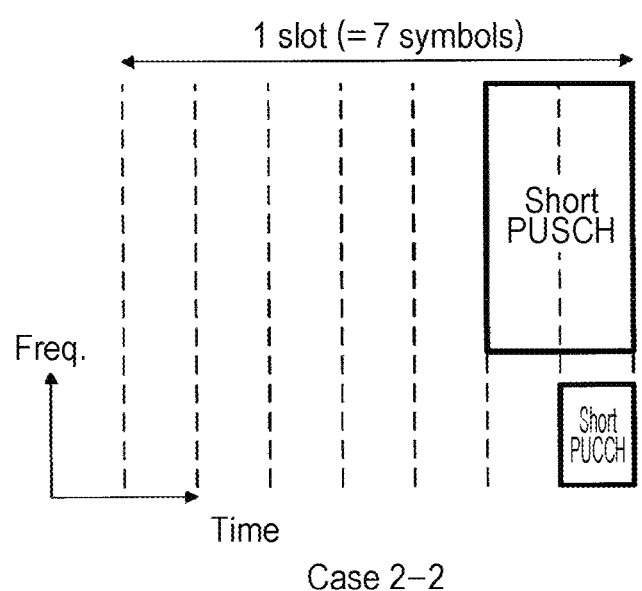
FIG. 3B depicts an example of a short PUCCH-short PUSCH simultaneous transmission (case 2-2).

In FIG. 3A, a case is assumed where a short PUCCH transmission interval and a short PUSCH transmission interval are completely overlapped (case 2-1). Furthermore, as depicted in FIG. 3B, a case is also assumed where the symbol lengths of a short PUCCH and a short PUSCH are different, that is, a case where a short PUCCH transmission interval and a short PUSCH transmission interval are partially overlapped (case 2-2).

[Case 3: Long PUCCH-Short PUSCH Simultaneous Transmission]

Figure 4A:
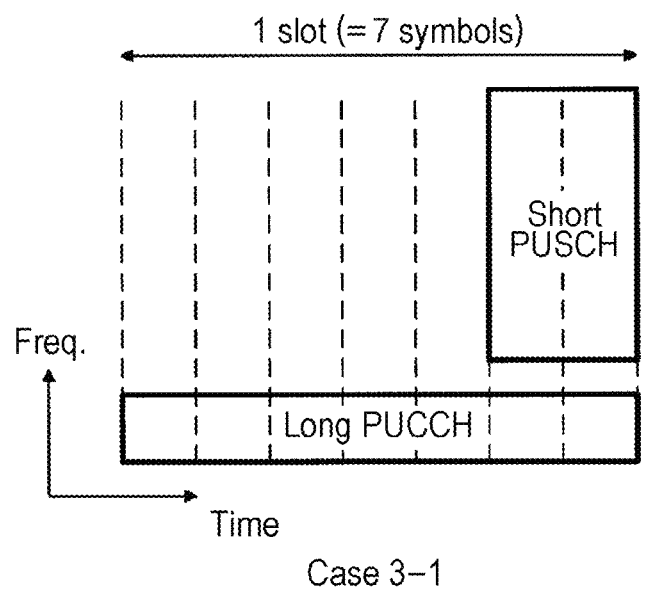
FIG. 4A depicts an example of a long PUCCH-short PUSCH simultaneous transmission (case 3-1).
Figure 4B:
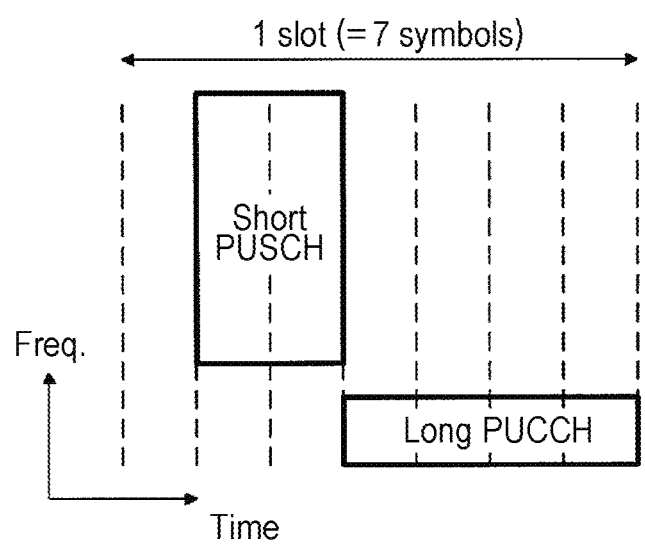
FIG. 4B depicts an example of a long PUCCH-short PUSCH simultaneous transmission (case 3-2).

In FIG. 4A, a case is assumed where a long PUCCH transmission interval and a short PUSCH transmission interval are partially overlapped (case 3-1). Furthermore, as depicted in FIG. 4B, a case is also assumed where a transmission interval for a long PUCCH and a transmission interval for a short PUSCH are not overlapped (case 3-2).

[Case 4: Short PUCCH-Long PUSCH Simultaneous Transmission]

Figure 5A:
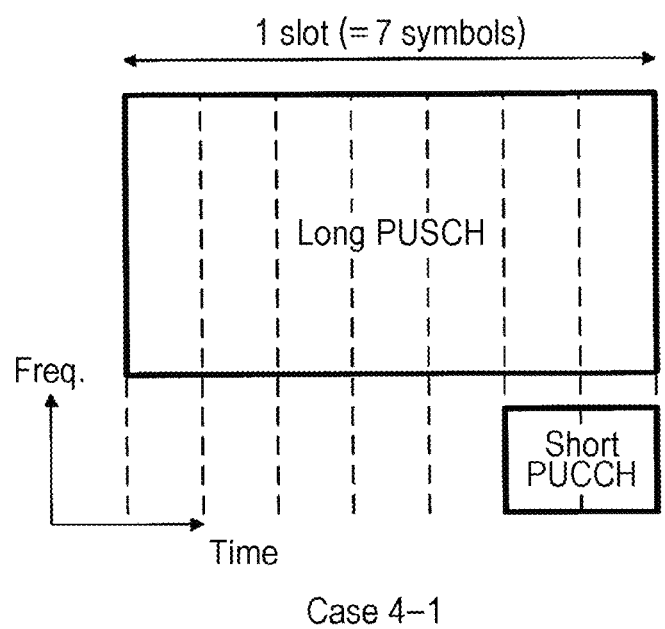
FIG. 5A depicts an example of a short PUCCH-long PUSCH simultaneous transmission (case 4-1).
Figure 5B:
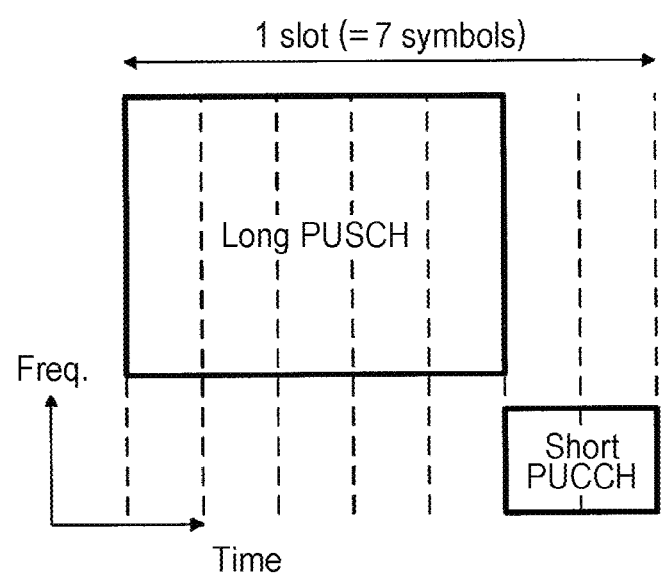
FIG. 5B depicts an example of a short PUCCH-long PUSCH simultaneous transmission (case 4-2).

In FIG. 5A, a case is assumed where a short PUCCH transmission interval and a long PUSCH transmission interval are partially overlapped (case 4-1). Furthermore, as depicted in FIG. 5B, a case is also assumed where a transmission interval for a short PUCCH and a transmission interval for a long PUSCH transmission interval are not overlapped (case 4-2).

Embodiment 1

[Overview of Communication System]

The communication system according to each embodiment of the present disclosure is provided with a base station 100 and a terminal 200.

Figure 6:
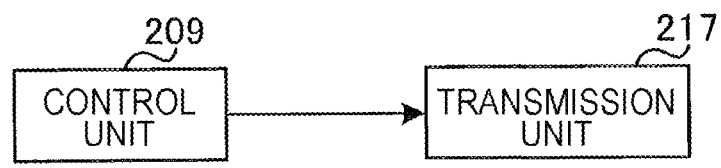
FIG. 6 depicts the configuration of a portion of a terminal according to embodiment 1.

FIG. 6 is a block diagram depicting the configuration of the terminal 200 according to each embodiment of the present disclosure. In the terminal 200 depicted in FIG. 6, in a slot having allocated thereto both an uplink control channel (PUCCH) and an uplink channel (PUSCH) that includes uplink data, in a case where the difference between the power spectrum density (PSD) of the PUCCH and the PSD of the PUSCH is greater than a threshold value (permitted difference), the control unit 209 drops symbols of the PUSCH in the transmission interval for the PUSCH overlapping with the transmission interval for the PUCCH. A transmission unit 217 transmits at least the PUCCH in the slot.

[Configuration of Base Station]

Figure 7:
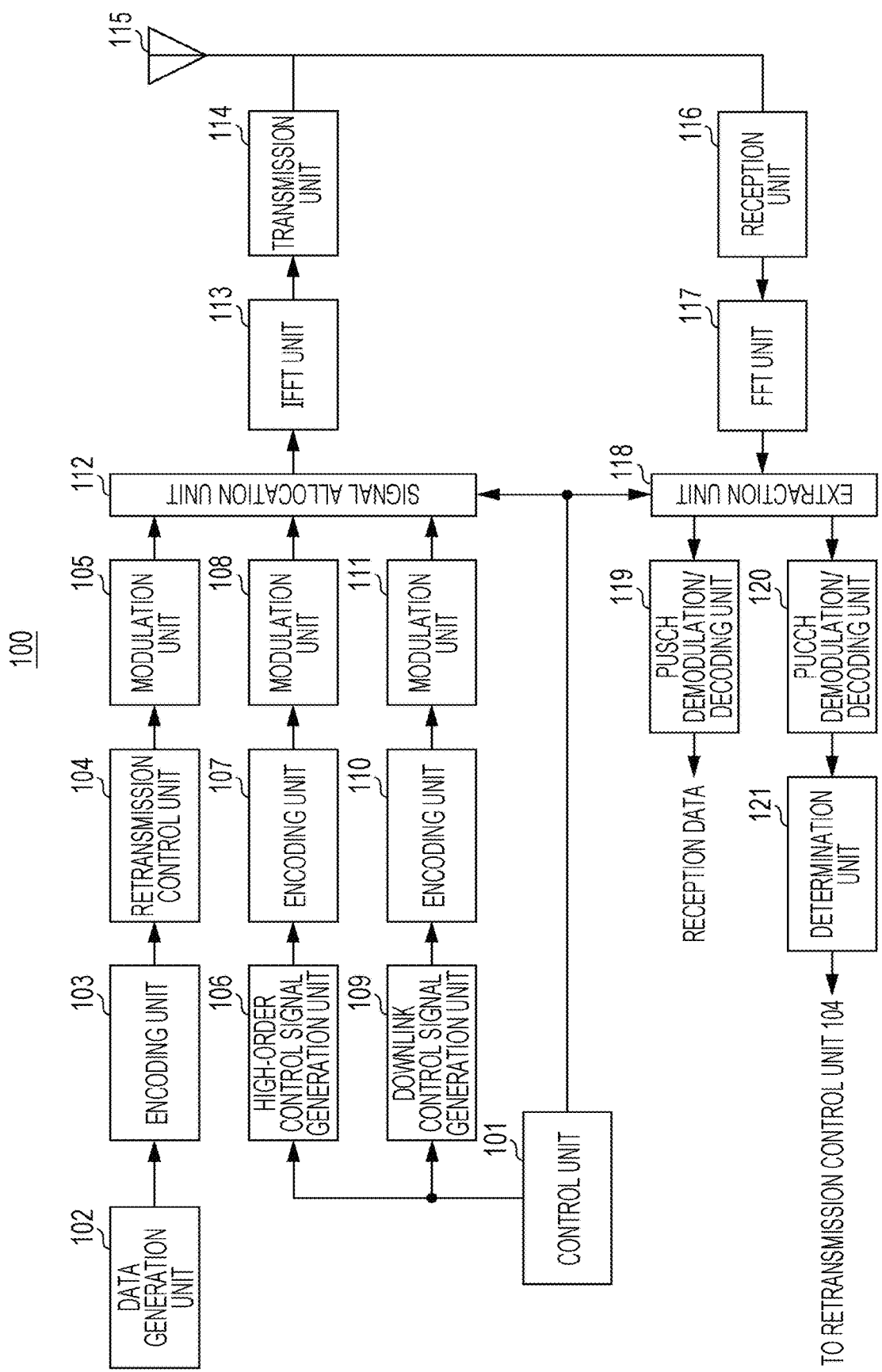
FIG. 7 depicts the configuration of a base station according to embodiment 1.

FIG. 7 is a block diagram depicting the configuration of the base station 100 according to embodiment 1 of the present disclosure. In FIG. 7, the base station 100 has a control unit 101, a data generation unit 102, an encoding unit 103, a retransmission control unit 104, a modulation unit 105, a higher layer control signal generation unit 106, an encoding unit 107, a modulation unit 108, a downlink control signal generation unit 109, an encoding unit 110, a modulation unit 111, a signal allocation unit 112, an IFFT (inverse fast Fourier transform) unit 113, a transmission unit 114, an antenna 115, a reception unit 116, an FFT (fast Fourier transform) unit 117, an extraction unit 118, a PUSCH demodulation/decoding unit 119, a PUCCH demodulation/decoding unit 120, and a determination unit 121.

The control unit 101 decides whether or not a PUCCH-PUSCH simultaneous transmission is to be set with respect to the terminal 200, and transmits decided information to the terminal 200 (the control unit 209, which is described hereinafter) (not depicted). Furthermore, the control unit 101 outputs the decided information to the extraction unit 118.

Furthermore, the control unit 101 decides a radio resource allocation for a downlink signal (for example, a PDSCH: physical downlink shared channel), and outputs downlink resource allocation information that instructs the resource allocation for the downlink signal, to the downlink control signal generation unit 109 and the signal allocation unit 112.

Furthermore, the control unit 101 decides a PUCCH resource allocation for transmitting an ACK/NACK signal with respect to a downlink signal, and outputs PUCCH resource allocation information that instructs the PUCCH resource allocation, to the downlink control signal generation unit 109 and the extraction unit 118. Furthermore, the control unit 101 decides a radio resource allocation for an uplink signal (PUSCH), and outputs PUSCH resource allocation information that instructs a PUSCH resource allocation, to the downlink control signal generation unit 109 and the extraction unit 118.

Furthermore, the control unit 101 decides information relating to transmission power control for an uplink signal, and outputs the decided information to the higher layer control signal generation unit 106 or the downlink control signal generation unit 109. At such time, the control unit 101 may decide information relating to radio resource allocation for the uplink signal and transmission power control for the uplink signal using a PHR (power headroom), which is input from the control unit 209 of the terminal 200.

The data generation unit 102 generates downlink data for the terminal 200, and outputs the downlink data to the encoding unit 103.

The encoding unit 103 carries out error correction encoding on the downlink data that is input from the data generation unit 102, and outputs the encoded data signal to the retransmission control unit 104.

The retransmission control unit 104, at the time of the first transmission, retains the encoded data signal that is input from the encoding unit 103, and also outputs the encoded data signal to the modulation unit 105. Furthermore, the retransmission control unit 104 outputs corresponding retained data to the modulation unit 105 when a NACK for the transmitted data signal is input from the determination unit 121 described later. Meanwhile, the retransmission control unit 104 deletes corresponding retained data when an ACK for the transmitted data signal is input from the determination unit 121.

The modulation unit 105 modulates the data signal that is input from the retransmission control unit 104, and outputs the modulated data signal to the signal allocation unit 112.

The higher layer control signal generation unit 106 generates a control information bit string using control information that is input from the control unit 101, and outputs the generated control information bit string to the encoding unit 107.

The encoding unit 107 carries out error correction encoding on the control information bit string that is input from the higher layer control signal generation unit 106, and outputs an encoded control signal to the modulation unit 108.

The modulation unit 108 modulates a control signal that is input from the encoding unit 107, and outputs the modulated control signal to the signal allocation unit 112.

The downlink control signal generation unit 109 generates a control information bit string using control information that is input from the control unit 101 (PUCCH resource allocation information, PUSCH resource allocation information, downlink resource allocation information, or the like), and outputs the generated control information bit string to the encoding unit 110. It should be noted that, since control information is sometimes transmitted to a plurality of terminals, the downlink control signal generation unit 109 may generate bit strings with the terminal ID of each terminal being included in the control information for each terminal.

Furthermore, the downlink control signal generation unit 109 may generate a group common control information bit string that is addressed to a plurality of terminals, using information instructing the type of slot or resource quantity (number of symbols or the like) that can be used for an uplink.

The encoding unit 110 carries out error correction encoding on the control information bit string that is input from the downlink control signal generation unit 109, and outputs an encoded control signal to the modulation unit 111.

The modulation unit 111 modulates the control signal that is input from the encoding unit 110, and outputs the modulated control signal to the signal allocation unit 112.

The signal allocation unit 112 maps the data signal that is input from the modulation unit 105 to a radio resource on the basis of the downlink resource allocation information that is input from the control unit 101. Furthermore, the signal allocation unit 112 maps the control signal that is input from the modulation unit 108 or the modulation unit 111 to a radio resource. The signal allocation unit 112 outputs a downlink signal for which signal mapping has been carried out, to IFFT unit 113.

The IFFT unit 113 carries out transmission waveform generation processing such as OFDM (orthogonal frequency division multiplexing) on the signal that is input from the signal allocation unit 112. The IFFT unit 113 adds a CP (cyclic prefix) in the case of an OFDM transmission in which a CP is to be added (not depicted). The IFFT unit 113 outputs the generated transmission waveform to the transmission unit 114.

The transmission unit 114 carries out RF (radio frequency) processing such as D/A (digital-to-analog) conversion or up-conversion on the signal that is input from the IFFT unit 113, and transmits a radio signal to the terminal 200 via the antenna 115.

The reception unit 116 carries out RF processing such as down-conversion or A/D (analog-to-digital) conversion on an uplink signal waveform from the terminal 200 received via the antenna 115, and outputs the uplink signal waveform having been subjected to reception processing to the FFT unit 117.

The FFT unit 117 carries out FFT processing in which a time domain signal is converted into a frequency domain signal, on the uplink signal waveform that is input from the reception unit 116. The FFT unit 117 outputs the frequency domain signal obtained by the FFT processing to the extraction unit 118.

The extraction unit 118 extracts a radio resource in which a PUCCH and PUSCH have been transmitted, from the signal that is input from the FFT unit 117, on the basis of information received from the control unit 101 (uplink resource allocation information, PUCCH resource allocation information, or the like), and outputs extracted radio resource components (a PUSCH signal and a PUCCH signal) to the PUSCH demodulation/decoding unit 119 and the PUCCH demodulation/decoding unit 120 respectively.

The PUSCH demodulation/decoding unit 119 carries out equalization, demodulation, and error correction decoding on the PUSCH signal that is input from the extraction unit 118, and outputs a decoded data bit sequence (reception data).

The PUCCH demodulation/decoding unit 120 carries out equalization, demodulation, and error correction decoding on the PUCCH signal that is input from the extraction unit 118, and outputs a decoded bit sequence to the determination unit 121.

The determination unit 121 determines whether an ACK/NACK signal transmitted from the terminal 200 indicates an ACK or NACK with respect to a transmitted data signal, on the basis of the bit sequence that is input from the PUCCH demodulation/decoding unit 120. The determination unit 121 outputs a determination result to the retransmission control unit 104.

[Configuration of Terminal]

Figure 8:
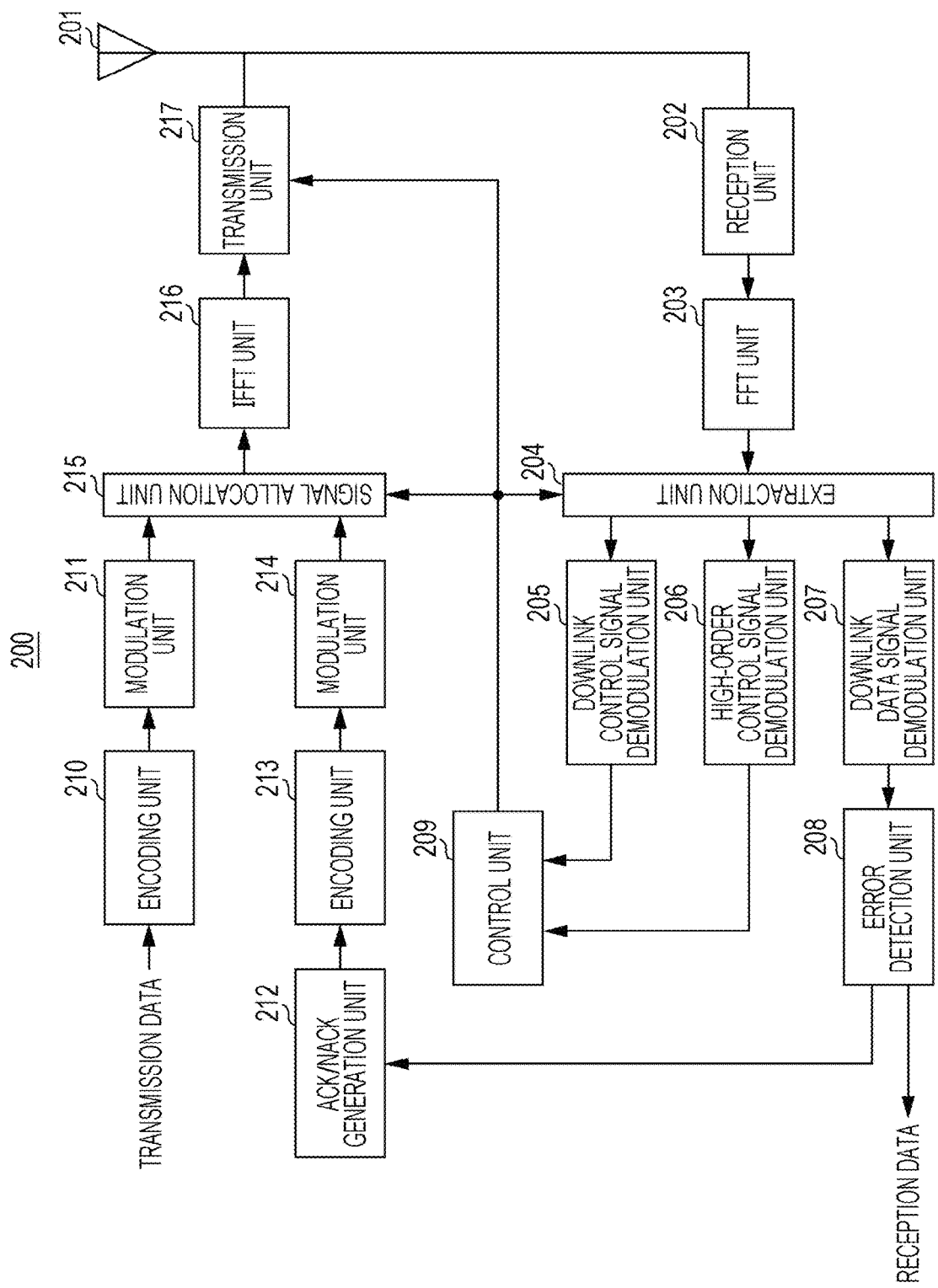
FIG. 8 depicts the configuration of the terminal according to embodiment 1.

FIG. 8 is a block diagram depicting the configuration of the terminal 200 according to embodiment 1 of the present disclosure. In FIG. 8, the terminal 200 has an antenna 201, a reception unit 202, an FFT unit 203, an extraction unit 204, a downlink control signal demodulation unit 205, a higher layer control signal demodulation unit 206, a downlink data signal demodulation unit 207, an error detection unit 208, the control unit 209, an encoding unit 210, a modulation unit 211, an ACK/NACK generation unit 212, an encoding unit 213, a modulation unit 214, a signal allocation unit 215, an IFFT unit 216, and the transmission unit 217.

The reception unit 202 carries out RF processing such as down-conversion or A/D (analog-to-digital) conversion with respect to the signal waveform of a downlink signal (data signal or control signal) from the base station 100 received via the antenna 201, and outputs an obtained reception signal (baseband signal) to the FFT unit 203.

The FFT unit 203 carries out FFT processing in which a time domain signal is converted into a frequency domain signal, on the signal (time domain signal) that is input from the reception unit 202. The FFT unit 203 outputs a frequency domain signal obtained by the FFT processing to the extraction unit 204.

The extraction unit 204 extracts a downlink control signal from the signal that is input from the FFT unit 203, on the basis of control information that is input from the control unit 209, and outputs the downlink control signal to the downlink control signal demodulation unit 205. Furthermore, the extraction unit 204 extracts a higher layer control signal and a downlink data signal on the basis of the control information that is input from the control unit 209, outputs the higher layer control signal to the higher layer control signal demodulation unit 206, and outputs the downlink data signal to the downlink data signal demodulation unit 207.

The downlink control signal demodulation unit 205 carries out blind decoding on the downlink control signal that is input from the extraction unit 204, and, when having determined that the downlink control signal is a control signal addressed thereto, demodulates and outputs the control signal to the control unit 209.

The higher layer control signal demodulation unit 206 demodulates the higher layer control signal that is input from the extraction unit 204, and outputs the demodulated higher layer control signal to the control unit 209.

The downlink data signal demodulation unit 207 demodulates/decodes the downlink data signal that is input from the extraction unit 204, and outputs the decoded downlink data signal to the error detection unit 208.

The error detection unit 208 carries out error detection on the downlink data that is input from the downlink data signal demodulation unit 207, and outputs the error detection result to the ACK/NACK generation unit 212. Furthermore, the error detection unit 208 outputs, as reception data, downlink data determined as having no errors as a result of the error detection.

The control unit 209 calculates a radio resource allocation for a downlink data signal on the basis of downlink resource allocation information indicated in the control signal that is input from the downlink control signal demodulation unit 205, and outputs information indicating the calculated radio resource allocation to the extraction unit 204.

Furthermore, the control unit 209 sets a PUCCH resource with which an uplink control signal such as an ACK/NACK signal is transmitted, and a PUSCH resource with which uplink data is transmitted, using the higher layer control signal that is input from the higher layer control signal demodulation unit 206, and the control signal that is input from the downlink control signal demodulation unit 205. The control unit 209 then outputs information relating to the uplink resources that have been set, to the signal allocation unit 215.

Furthermore, the control unit 209 decides the transmission power and time/frequency resources for a PUCCH and PUSCH actually transmitted by the terminal 200, by means of a method described later, and outputs the decided information to the transmission unit 217.

The encoding unit 210 carries out error correction encoding on a transmission bit string (uplink data) that is input, and outputs an encoded data signal to the modulation unit 211.

The modulation unit 211 modulates the data signal that is input from the encoding unit 210, and outputs the modulated control signal to the signal allocation unit 215.

The ACK/NACK generation unit 212 generates an ACK/NACK signal (ACK or NACK) for the received downlink data, on the basis of an error detection result that is input from the error detection unit 208. The ACK/NACK generation unit 212 outputs the generated ACK/NACK signal (bit sequence) to the encoding unit 213.

The encoding unit 213 carries out error correction encoding on the bit sequence that is input from the ACK/NACK generation unit 212, and outputs the encoded bit sequence (ACK/NACK signal) to the modulation unit 214.

The modulation unit 214 modulates the ACK/NACK signal that is input from the encoding unit 213, and outputs the modulated ACK/NACK signal to the signal allocation unit 215.

The signal allocation unit 215 maps the data signal that is input from the modulation unit 211, and the ACK/NACK signal that is input from the modulation unit 214, respectively to radio resources instructed from the control unit 209. The signal allocation unit 215 outputs an uplink signal for which signal mapping has been carried out, to IFFT unit 216.

The IFFT unit 216 carries out transmission waveform generation processing such as OFDM on the signal that is input from the signal allocation unit 215. The IFFT unit 216 adds a CP (cyclic prefix) in the case of an OFDM transmission in which a CP is to be added (not depicted). Alternatively, in a case where the IFFT unit 216 is to generate a single carrier waveform, a DFT (discrete Fourier transform) unit may be added at a stage prior to the signal allocation unit 215 (not depicted). The IFFT unit 216 outputs the generated transmission waveform to the transmission unit 217.

The transmission unit 217 carries out RF (radio frequency) processing such as transmission power control, D/A (digital-to-analog) conversion, or up-conversion that is based on information input from the control unit 209, on the signal that is input from the IFFT unit 216, and transmits a radio signal to the base station 100 via the antenna 201.

[Operation of Base Station 100 and Terminal 200]

A detailed description will be given regarding an operation in the base station 100 and the terminal 200 having the above configurations.

Figure 9:
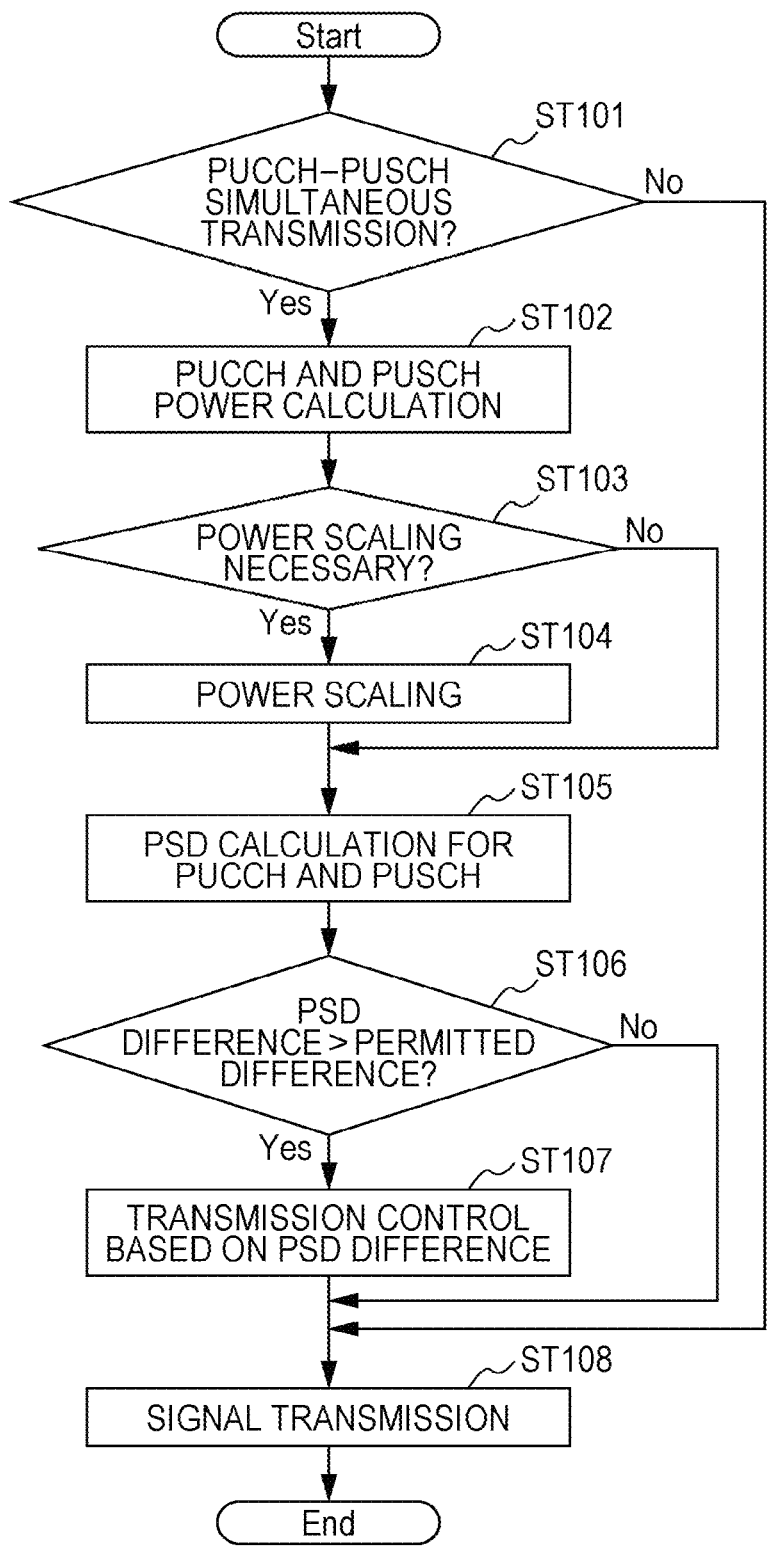
FIG. 9 depicts processing carried out by the terminal according to embodiment 1.

FIG. 9 depicts a flow of the processing carried out by the terminal 200 according to the present embodiment.

The base station 100 sets a mode (PUCCH-PUSCH simultaneous transmission mode) in which a PUCCH and PUSCH are transmitted simultaneously within the same slot to the terminal 200.

Furthermore, the base station 100 notifies the terminal 200 of parameters required for transmission power control of the terminal 200. Here, as parameters required for transmission power control of the terminal 200, there are, for example, a parameter relating to a target reception power, a weighting coefficient for fractional TPC (transmit power control), propagation loss, an offset based on MCS (modulation and coding), a correction value according to a TPC command, a parameter relating to a PUCCH format, and the like.

The terminal 200 determines whether or not the PUCCH-PUSCH simultaneous transmission mode has been set thereto (ST101). In a case where the PUCCH-PUSCH simultaneous transmission mode has not been set (ST101: no), the terminal 200, for example, transmits a PUCCH or PUSCH by means of the radio resource (slot or the like) allocated to each thereof (ST108).

However, in a case where the PUCCH-PUSCH simultaneous transmission mode has been set (ST101: yes), the terminal 200 respectively calculates the transmission power for the PUCCH and PUSCH (ST102). For example, with LTE-Advanced as an example, the terminal 200 may use a transmission power calculation formula for a PUCCH and PUSCH described in NPL 3.

Furthermore, in a case where there are symbols in which a PUCCH and PUSCH are transmitted at the same time within the same slot (that is, in a case where a PUCCH transmission interval and a PUSCH transmission interval are overlapped (corresponding to case 1-1, case 1-2, case 2-1, case 2-2, case 3-1, and case 4-1)), the terminal 200 calculates the sum of the PUCCH transmission power and the PUSCH transmission power (total transmission power) using the transmission power values of the PUCCH and PUSCH.

The terminal 200 then compares the total transmission power of the PUCCH and PUSCH and the maximum transmission power ($P_{max}$) specific to the UE, and determines whether or not power scaling is required (ST103). Specifically, the terminal 200 determines that "power scaling is not required" if the total transmission power is less than or equal to the maximum transmission power specific to the UE, and determines that "power scaling is required" in a case where the total transmission power is greater than the maximum transmission power specific to the UE.

In a case where "power scaling is not required" (ST103: no), the terminal 200 calculates the PSD of the PUCCH and PUSCH, which is described later (ST105).

However, in a case where "power scaling is required" (ST103: yes), the terminal 200 carries out power scaling (ST104). For example, as power scaling for a PUSCH in the terminal 200, with LTE-Advanced as an example, a method such as the following formula (1) may be used.

$$P_{PUSCH,tx} = P_{max} - P_{PUCCH} \quad (1)$$

Here, $P_{PUSCH, tx}$ indicates the PUSCH transmission power after power scaling, $P_{max}$ indicates the maximum transmission power specific to the UE, and $P_{PUCCH}$ indicates the PUCCH transmission power.

Furthermore, the terminal 200 carries out scaling for the PUSCH transmission power (for example, see NPL 6) in accordance with power scaling method 1 or power scaling method 2 described hereinafter.

<Power Scaling Method 1>

The terminal 200 carries out power scaling with respect to all of the PUSCH symbols in the target slot for which "power scaling is required".

Figure 10:
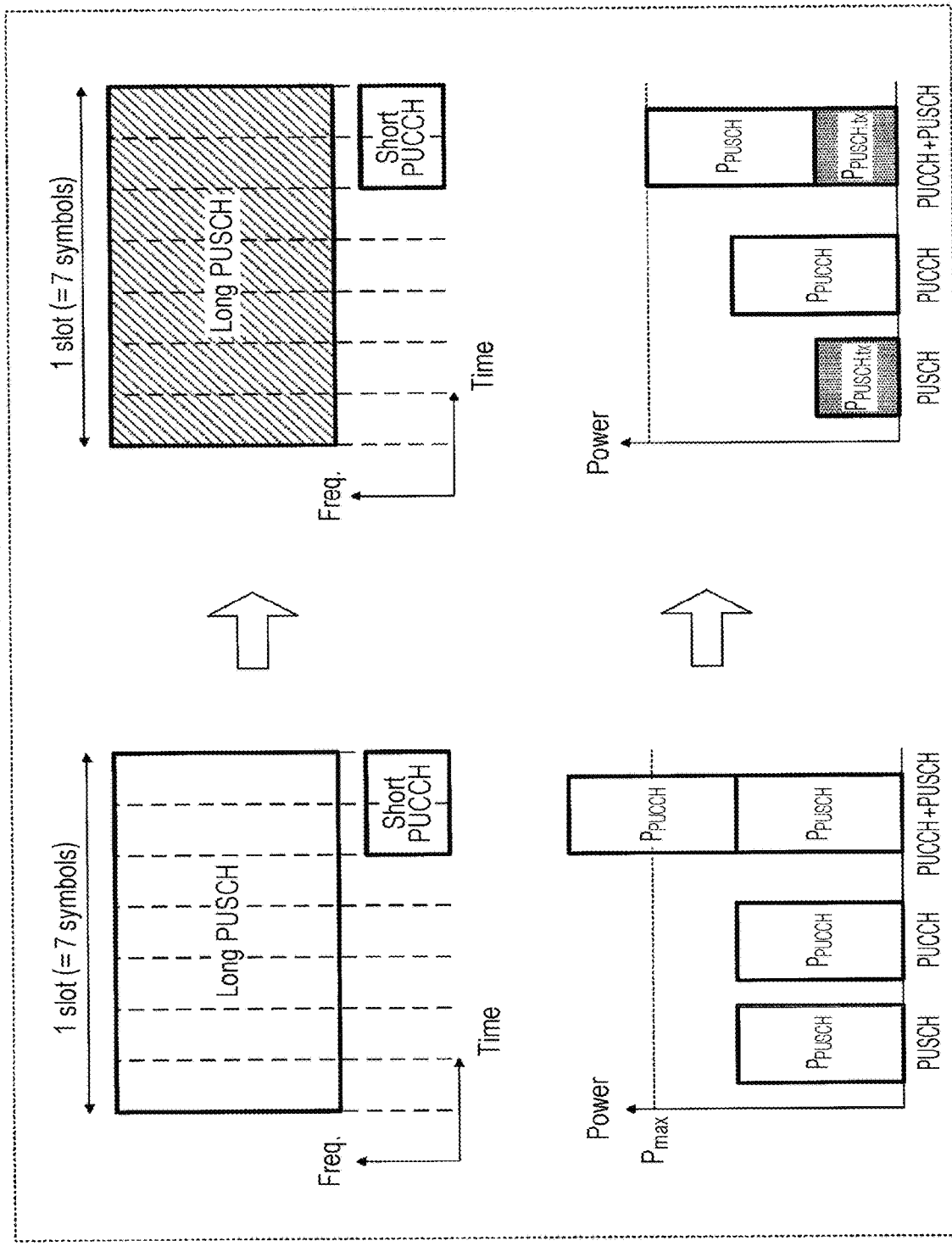
FIG. 10 depicts an example of power scaling according to embodiment 1.

FIG. 10 depicts an example of power scaling in power scaling method 1. In FIG. 10, the sum of the PUSCH transmission power ($P_{PUSCH}$) and the PUCCH transmission power ($P_{PUCCH}$) exceeds the maximum transmission power ($P_{max}$). In response, in FIG. 10, due to the terminal 200 carrying out power scaling with respect to all seven symbols within a slot, the PUSCH transmission power ($P_{PUSCH}$) decreases and the sum of the PUSCH transmission power ($P_{PUSCH}$) and the PUCCH transmission power ($P_{PUCCH}$) becomes less than or equal to the maximum transmission power ($P_{max}$).

<Power Scaling Method 2>

The terminal 200 carries out power scaling with respect to the PUSCH symbols of the PUSCH transmission interval overlapping with the PUCCH transmission interval within the target slot for which "power scaling is required".

Figure 11:
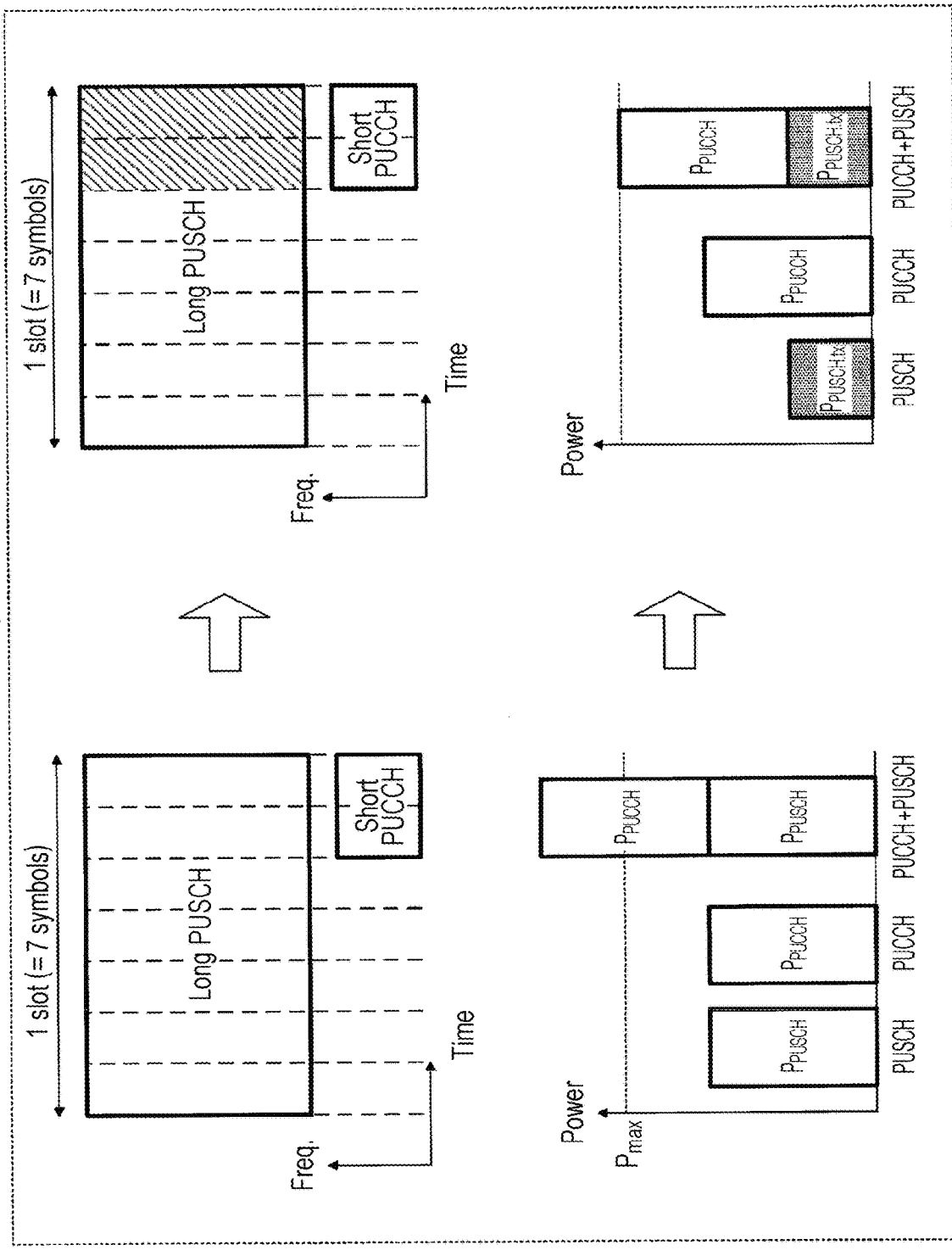
FIG. 11 depicts an example of power scaling according to embodiment 1.

FIG. 11 depicts an example of power scaling in power scaling method 2. In FIG. 11, the sum of the PUSCH transmission power ($P_{PUSCH}$) and the PUCCH transmission power ($P_{PUCCH}$) exceeds the maximum transmission power ($P_{max}$). In response, in FIG. 11, due to the terminal 200 carrying out power scaling with respect to PUSCH symbols (two symbols) of a long PUSCH transmission interval overlapping with a short PUCCH transmission interval from among the seven symbols within the slot, the PUSCH transmission power ($P_{PUSCH}$) decreases and the sum of the PUSCH transmission power ($P_{PUSCH}$) and the PUCCH transmission power ($P_{PUCCH}$) becomes less than or equal to the maximum transmission power ($P_{max}$).

Power scaling methods 1 and 2 have been described hereinabove. It should be noted that the PUSCH and PUCCH configurations depicted in FIGS. 10 and 11 are examples, and the same is also true for other configurations.

Next, in a case where there are symbols in which a PUCCH and PUSCH are transmitted at the same time within the same slot (that is, in a case where a PUCCH transmission interval and a PUSCH transmission interval are overlapped; corresponding to case 1-1, case 1-2, case 2-1, case 2-2, case 3-1, and case 4-1), the terminal 200 calculates the PSD of the PUCCH and PUSCH (ST105). For example, the terminal 200 may calculate the PSD from the transmission power and the transmission bandwidth of each channel.

The terminal 200 then compares the difference between the PSD of the PUSCH and the PSD of the PUCCH, and the permitted difference for PSD ($PSD_{limit}$) specific to the UE, and thereby determines whether or not transmission control based on the PSD difference is required (ST106).

In a case where the PSD difference between the PUCCH and PUSCH is less than or equal to the permitted difference for PSD specific to the UE (ST106: no), the terminal 200 determines that "transmission control based on the PSD difference is not required", and, in the same slot, transmits the PUSCH and PUCCH by means of transmission power obtained after power scaling (including also the case where power scaling is not carried out) (ST108).

However, in a case where the PSD difference between the PUCCH and PUSCH is greater than the PSD permitted difference specific to the UE (ST106: yes), the terminal 200 determines that "transmission control based on the PSD difference is required", and carries out transmission control based on the PSD difference (ST107).

In the present embodiment, the terminal 200, when having determined that "transmission control based on the PSD difference is required", drops (does not transmit or punctures) PUSCH symbols in the PUSCH transmission interval overlapping with the PUCCH transmission interval within the target slot.

Figure 12:
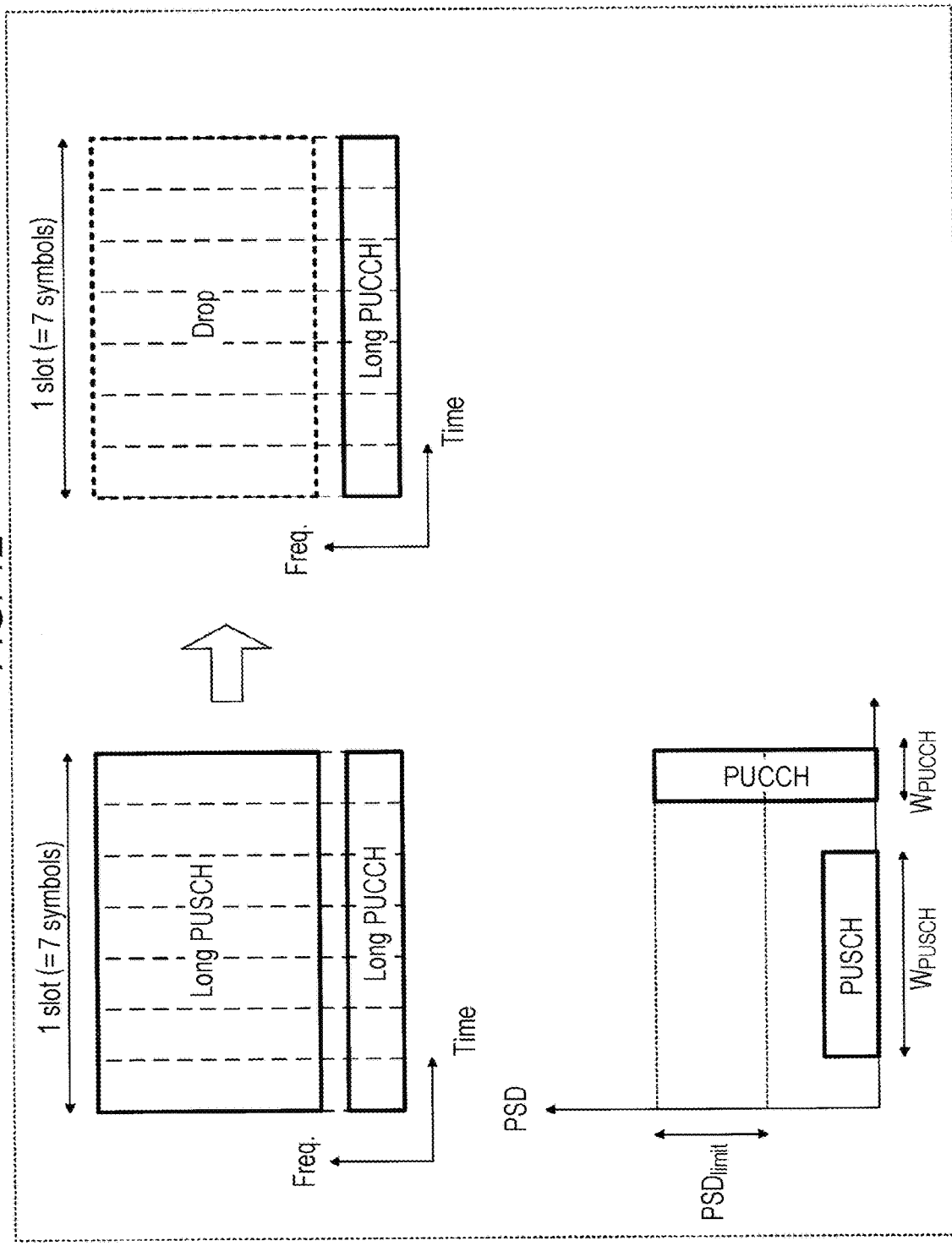
FIG. 12 depicts an example of transmission control based on the PSD difference according to embodiment 1.
Figure 13:
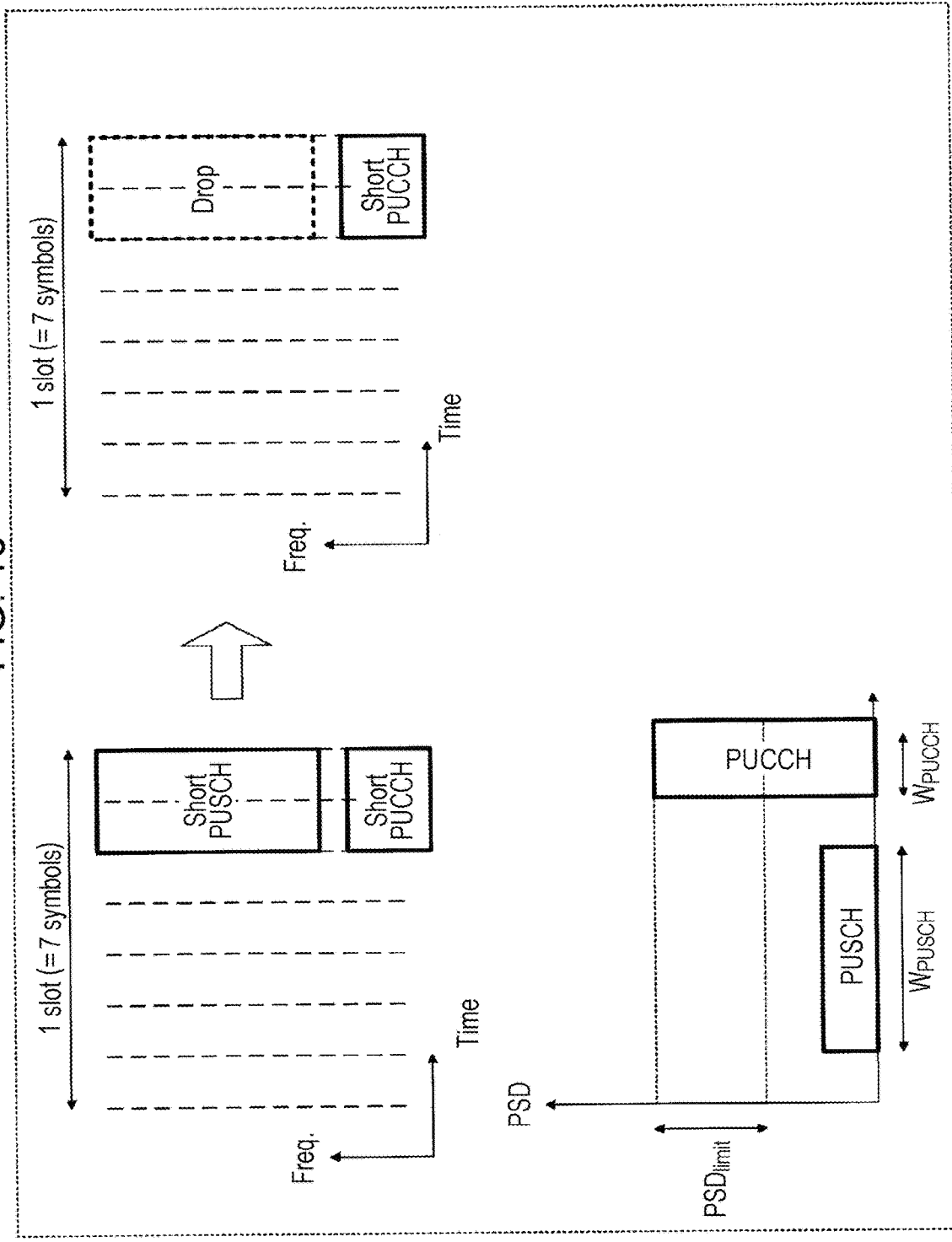
FIG. 13 depicts an example of transmission control based on the PSD difference according to embodiment 1.

As an example, FIG. 12 depicts transmission control for a case where a long PUCCH transmission interval and a long PUSCH transmission interval are completely overlapped (case 1-1), and FIG. 13 depicts transmission control for a case where a short PUCCH transmission interval and a short PUSCH transmission interval are completely overlapped (case 2-1).

In both cases in FIGS. 12 and 13, the difference in the PSD between the PUSCH and PUCCH is greater than the permitted difference ($PSD_{limit}$), and a state has been entered in which "transmission control based on the PSD difference is required".

In this case, the terminal 200 drops all symbols for the PUSCH overlapping with the PUCCH transmission interval within the target slot, as depicted in FIGS. 12 and 13. Thus, the terminal 200 transmits the PUCCH within the slot (ST108).

That is, the terminal 200 transmits the PUCCH but does not transmit the PUSCH in the slot, and it is therefore possible to avoid the PSD difference between the PUCCH and PUSCH affecting the transmission processing carried out by the terminal 200. That is, it is possible to prevent deterioration in the transmission quality of the PUCCH.

Furthermore, in this case, it is sufficient for the terminal 200 to drop the PUSCH symbols, and it is not necessary to carry out complex power control in addition to power scaling that takes the maximum transmission power specific to the UE into consideration.

Furthermore, due to the PUSCH symbols being dropped, it becomes easy to detect a state in which a PSD difference has occurred in the terminal 200, in PUSCH symbol detection processing in the base station 100. Specifically, in a case where the PSD difference becomes greater than the permitted difference during a PUCCH-PUSCH simultaneous transmission, the PUSCH symbols are dropped and not transmitted in the terminal 200. Thus, for example, in a case where a reception level that is equivalent to a noise level is measured in an interval in which a PUSCH is received, the base station 100 is able to easily determine that the PSD difference has become greater than the permitted difference in the terminal 200 and a PUSCH has been dropped. It thereby becomes possible for the base station 100 to implement appropriate transmission power control and resource allocation for the target terminal 200 in the subsequent slot.

Furthermore, since the effect of the PSD difference on transmission quality decreases due to the terminal 200 dropping the PUSCH in a case where the PSD difference between the PUCCH and PUSCH is greater than the permitted difference, there is no effect on the transmission of the PUCCH. Thus, according to the present embodiment, because the transmission quality of the PUCCH is assured, it is possible to prevent a decline in the transmission quality of a control signal such as an ACK/NACK signal having high priority compared to a data signal (PUSCH).

It should be noted that, although case 1-1 (FIGS. 2A and 12) and case 2-1 (FIGS. 3A and 13) have been described here, the same can be applied also to other cases.

<Case 3-1 (FIG. 4A)>

In long PUCCH-short PUSCH simultaneous transmission, in a case where a long PUCCH transmission interval and a short PUSCH transmission interval are partially overlapped, the terminal 200, when having determined that "transmission control based on the PSD difference is required", similar to the aforementioned, drops all symbols for the short PUSCH overlapped with the long PUCCH transmission interval within the target slot (not depicted).

<Case 4-1 (FIG. 5A)>

Figure 14:
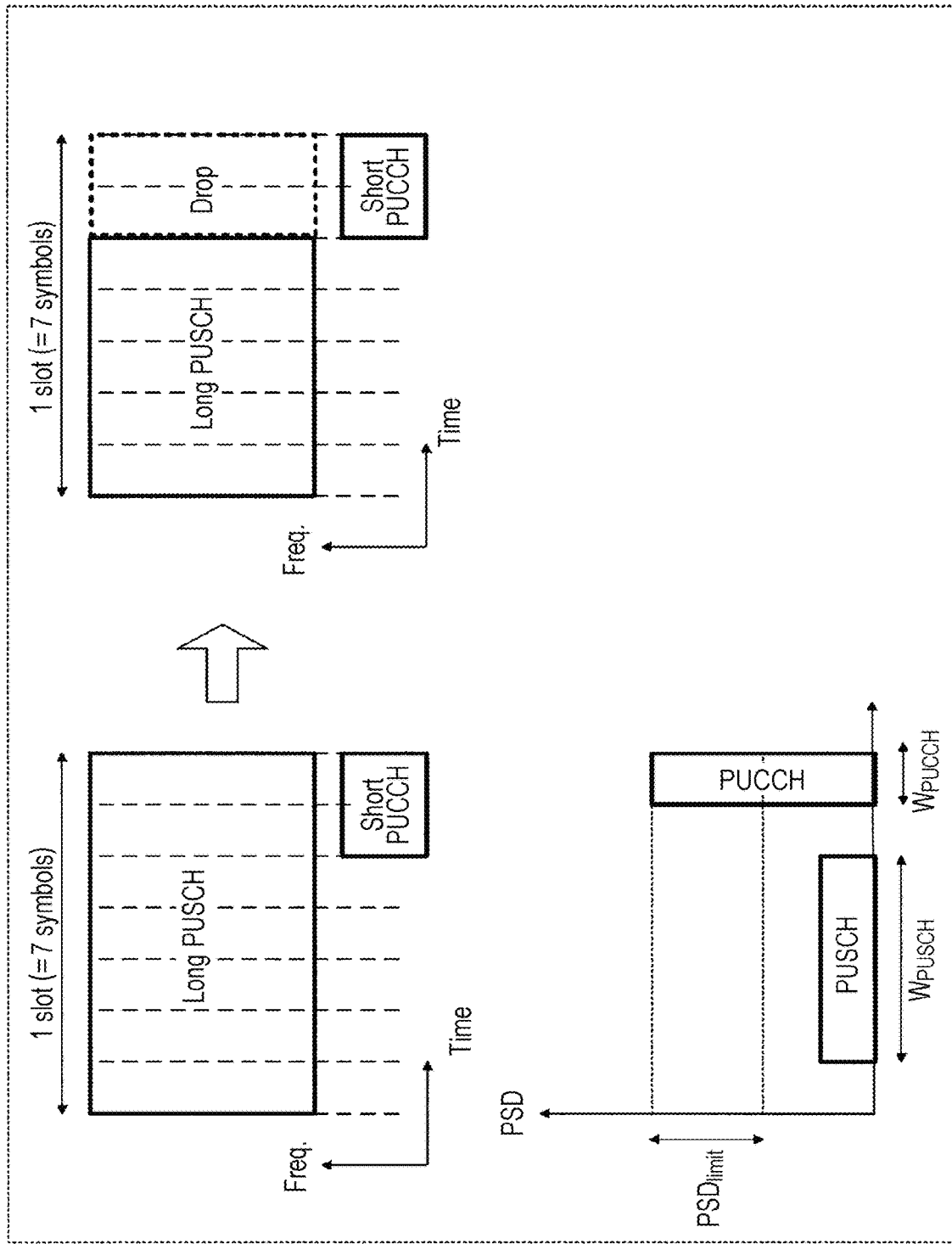
FIG. 14 depicts an example of transmission control based on the PSD difference according to embodiment 1.

In a case where a short PUCCH transmission interval and a long PUSCH transmission interval are partially overlapped, the terminal 200 carries out the transmission control depicted in FIG. 14. Specifically, as depicted in FIG. 14, the terminal 200, when having determined that "transmission control based on the PSD difference is required", drops the PUSCH symbols in the PUSCH transmission interval overlapping with the PUCCH transmission interval within the target slot (the last two symbols in FIG. 14). That is, in FIG. 14, the terminal 200 transmits, without dropping, the PUSCH symbols (the leading five symbols in FIG. 14) in the PUSCH transmission interval not overlapping with the PUCCH transmission interval within the target slot.

Also in the case depicted in FIG. 14, similar to FIGS. 12 and 13, it is possible to avoid the effect of a PSD difference between the PUCCH and PUSCH without it being necessary for the terminal 200 to carry out complex transmission power control in addition to power scaling that takes the maximum transmission power specific to the UE into consideration. Furthermore, also in FIG. 14, since PUSCH symbols are dropped, there is no effect on the PUCCH transmission, the transmission quality of the PUCCH is therefore assured, and there is therefore no decline in the transmission quality of a control signal such as an ACK/NACK signal having high priority.

In addition, in FIG. 14, from among the PUSCH symbols, the terminal 200 drops a portion of the symbols superposing the PUCCH symbols and does not drop the symbols not overlapping with the PUCCH symbols, and it is therefore possible to suppress a decline in the transmission quality of the signal transmitted by means of the PUSCH.

<Case 1-2 (FIG. 2B)>

In long PUCCH-long PUSCH simultaneous transmission, in a case where the symbol lengths of a long PUCCH and a long PUSCH are different (in a case where a long PUCCH transmission interval and a long PUSCH transmission interval are partially overlapped), the terminal 200, when having determined that "transmission control based on the PSD difference is required", similar to FIG. 14, drops the PUSCH symbols of the PUSCH transmission interval overlapping with the PUCCH transmission interval within the target slot, and transmits the PUSCH symbols of the PUSCH transmission interval not overlapping with the PUCCH transmission interval.

<Case 2-2 (FIG. 3B)>

In short PUCCH-short PUSCH simultaneous transmission, in a case where the symbol lengths of a short PUCCH and a short PUSCH are different (in a case where a short PUCCH transmission interval and a short PUSCH transmission interval are partially overlapped), the terminal 200, when having determined that "transmission control based on the PSD difference is required", similar to FIG. 14, drops the PUSCH symbols in the PUSCH transmission interval overlapping with the PUCCH transmission interval within the target slot, and transmits the PUSCH symbols of the PUSCH transmission interval not overlapping with the PUCCH transmission interval.

In this way, in the present embodiment, in a case where the PSD difference between a PUCCH and PUSCH is greater than the permitted difference in a slot to which both the PUCCH and PUSCH have been allocated (a slot in which a PUCCH-PUSCH simultaneous transmission is carried out), the terminal 200 drops the PUSCH symbols in the PUSCH transmission interval overlapping with the PUCCH transmission interval, and is thereby able to transmit at least the PUCCH (and the PUSCH not overlapping with the PUCCH transmission interval), avoiding the effect of the PSD difference. Thus, according to the present embodiment, it is possible for a PUCCH-PUSCH simultaneous transmission to be carried out while preventing a deterioration in transmission quality due to the permitted difference for PSD, without increasing the circuit scale of the terminal 200.

Modified Example of Embodiment 1

In embodiment 1, a description was given regarding a case where the terminal 200, when having determined that "transmission control based on the PSD difference is required", drops (does not transmit or punctures) PUSCH symbols in the PUSCH transmission interval overlapping with the PUCCH transmission interval within the target slot. This assumes that an ACK/NACK signal transmitted by a PUCCH has a higher priority than a data signal transmitted by a PUSCH.

However, it is also possible to change the channel that is dropped by changing the priorities of the channels. That is, the terminal 200, when having determined that "transmission control based on the PSD difference is required", may carry out an operation in which the symbols of a channel having a low priority are dropped (are not transmitted or are punctured) from among symbols in which a PUCCH transmission interval and a PUSCH transmission interval within the target slot are overlapped.

Embodiment 2

The base station and the terminal according to the present embodiment have basic configurations that are common to those of the base station 100 and the terminal 200 according to embodiment 1, and will therefore be described with reference to FIGS. 7 and 8.

In the present embodiment, the operations of the base station 100 and the terminal 200 up to power scaling being carried out are similar to those in embodiment 1. In the present embodiment, the transmission control (ST107 in FIG. 9) based on the PSD difference carried out when the terminal 200 has determined that "transmission control based on the PSD difference is required" is different from that in embodiment 1.

In embodiment 1, all of the PUSCH symbols within the target slot are dropped, for example, in a case where a PUCCH transmission interval and a PUSCH transmission interval are completely overlapped in a long PUCCH-short PUSCH simultaneous transmission (case 1-1 and case 2-1), a case where a PUCCH transmission interval and a PUSCH transmission interval are partially overlapped and the PUSCH transmission interval is shorter than the PUCCH transmission interval (case 3-1), or the like.

In this case, in PUSCH symbol detection processing in the base station 100, although there is an advantage in that it becomes easy to detect a state in which the PSD difference has become greater than the permitted difference in the terminal 200, it becomes necessary to retransmit the PUSCH signal that has been dropped.

Thus, in the present embodiment, a description will be given regarding a method for reducing deterioration in transmission quality caused by the PSD difference between a PUCCH and PUSCH, while preventing all of the PUSCH transmission being dropped, even in a case where transmission control based on the PSD difference is required.

Specifically, in a case where transmission control based on the PSD difference is required, the terminal 200 drops a portion of the resources of the frequency resources to which a PUSCH has been allocated in a PUSCH transmission interval overlapping with a PUCCH transmission interval. That is, the terminal 200 changes the use of the frequency resources for the PUSCH.

For example, in a case where the PSD difference between a PUCCH and PUSCH is greater than the PSD permitted difference specific to the UE (ST106 in FIG. 9: yes), the terminal 200 determines that "transmission control based on the PSD difference is required", and carries out transmission control based on the PSD difference described hereinafter (ST107 in FIG. 9).

Figure 15:
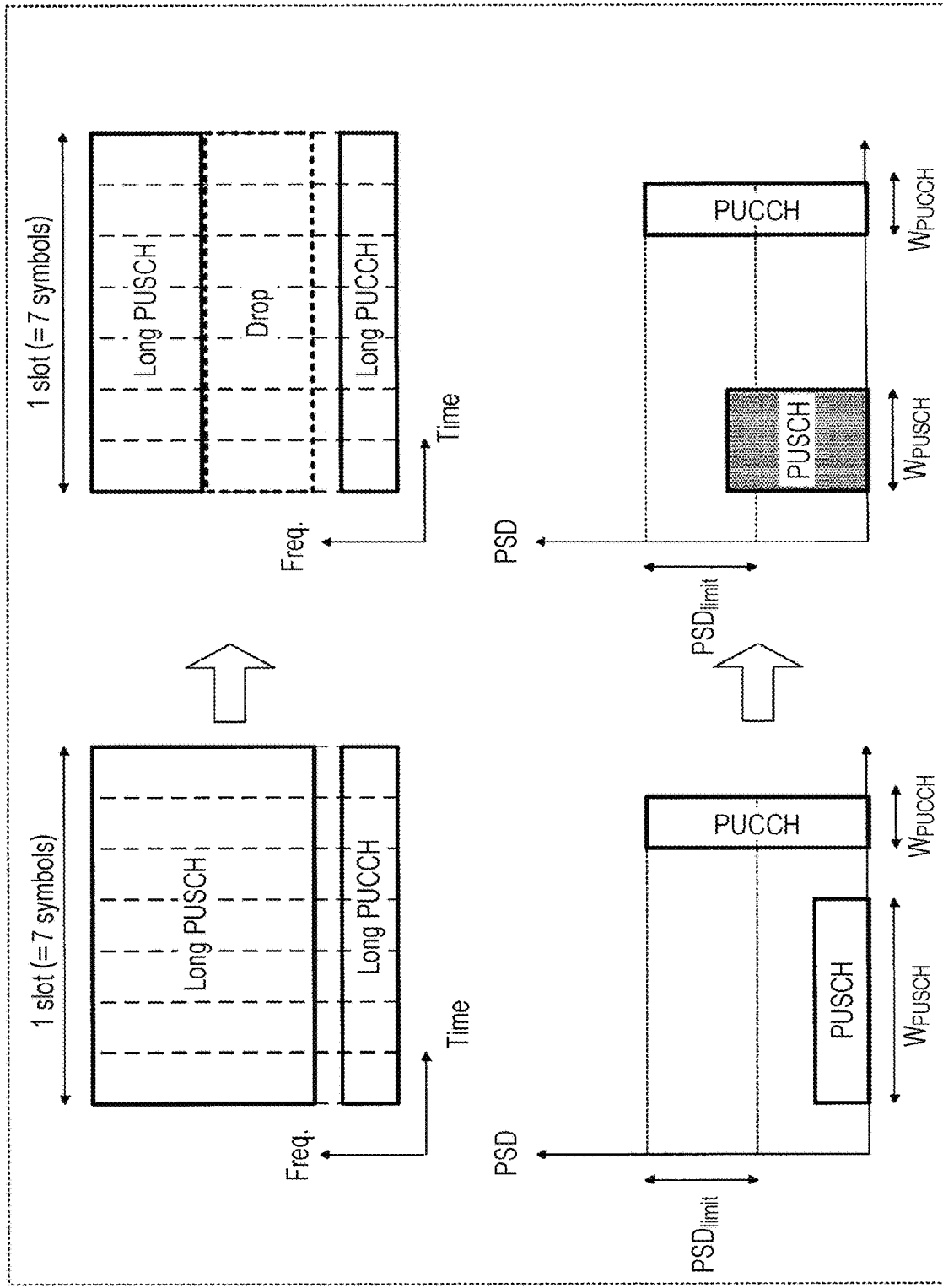
FIG. 15 depicts an example of transmission control based on the PSD difference according to embodiment 2.

In the present embodiment, as depicted in FIG. 15, the terminal 200, when having determined that "transmission control based on the PSD difference is required", with regard to PUSCH symbols (some or all of the PUSCH symbols) of the PUSCH transmission interval overlapping with the PUCCH transmission interval within the target slot, drops (does not transmit or punctures) a portion of the transmission band (PRB) allocated to the PUSCH. That is, the terminal 200 reduces the frequency resources for the PUSCH.

As mentioned above, the PSD increases when the occupied bandwidth narrows. Thus, as depicted in FIG. 15, due to a portion of the transmission band for the PUSCH being dropped, the bandwidth occupied by the PUSCH narrows and the PSD increases. Thus, as depicted in FIG. 15, after transmission control based on the PSD difference has been carried out, the difference in the PSD between the PUCCH and PUSCH becomes less than or equal to the permitted difference ($PSD_{limit}$).

It should be noted that, when the terminal 200 drops a portion of the transmission band for the PUSCH, the terminal 200 may calculate the quantity (PRB) of the dropped frequency resources from the PSD difference between the PUCCH and PUSCH and the PSD permitted difference specific to the UE, for example.

Figure 16:
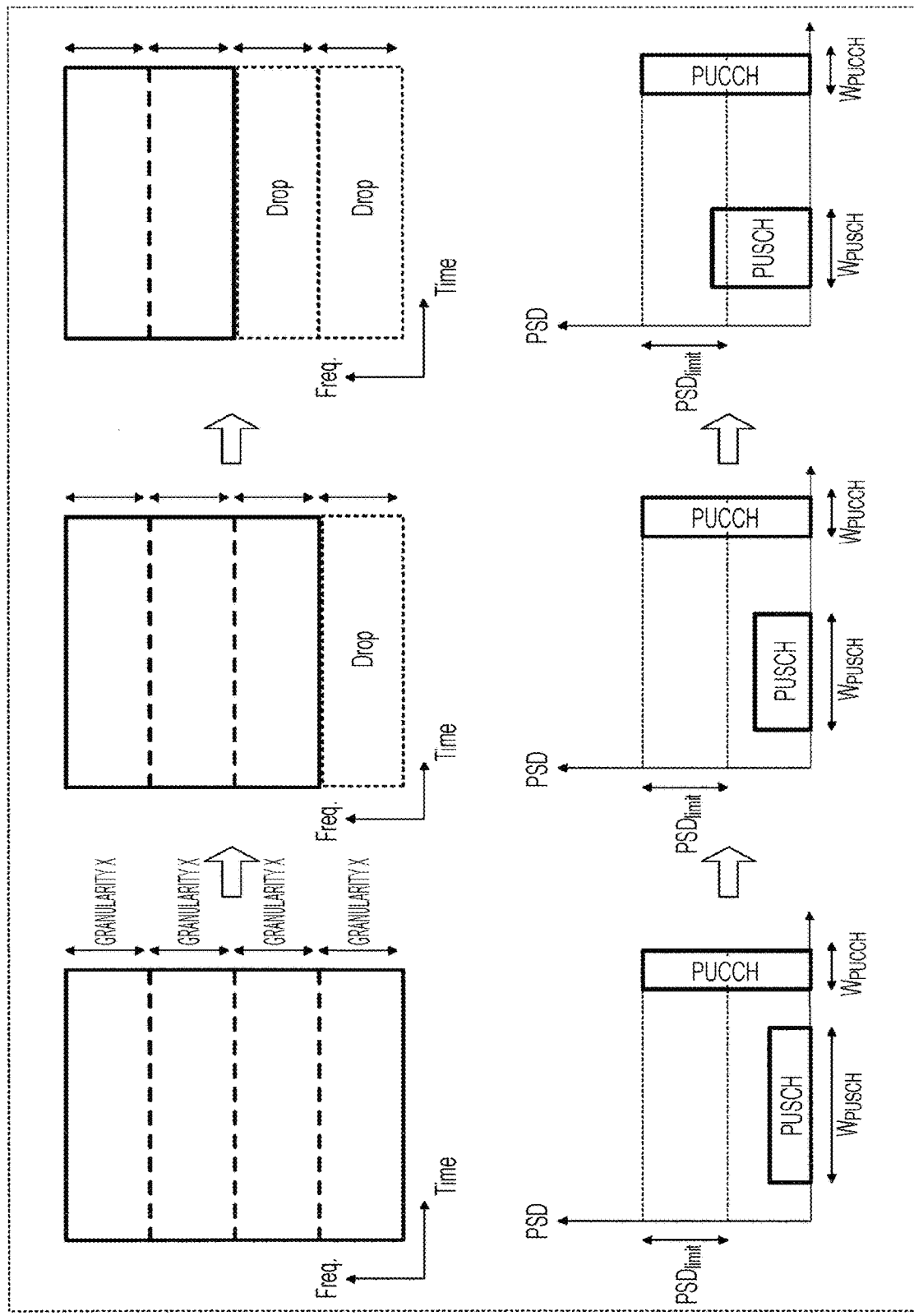
FIG. 16 depicts an example of a unit (granularity) for a frequency band that is dropped according to embodiment 2.

Furthermore, as depicted in FIG. 16, a unit (granularity) for the quantity (PRB) of the frequency resources for a PUSCH dropped by the terminal 200 may be defined as X PRB. The terminal 200, for example, may repeat dropping for each X PRB and calculation of the PSD difference between the PUCCH and PUSCH, and carry out simultaneous transmission of the PUCCH and PUSCH at a stage at which the PSD difference between the PUCCH and PUSCH becomes less than or equal to the PSD permitted difference specific to the UE.

In this way, in the present embodiment, the terminal 200 is able to increase the transmission PSD of a PUSCH by narrowing the transmission bandwidth of the PUSCH, and is able to make the PSD difference between the PUCCH and PUSCH be less than or equal to the PSD permitted difference specific to the UE. Furthermore, since the terminal 200 drops the PUSCH in a case where the PSD difference between the PUCCH and PUSCH becomes greater than the permitted difference, there is no effect on the transmission of the PUCCH. Thus, according to the present embodiment, because the transmission quality of the PUCCH is assured, it is possible to prevent a decline in the transmission quality of a control signal such as an ACK/NACK signal having high priority compared to a data signal (PUSCH). Thus, according to the present embodiment, in a slot in which a PUCCH-PUSCH simultaneous transmission is carried out, it is possible to carry out the PUCCH-PUSCH simultaneous transmission with a deterioration in transmission quality due to the permitted difference for PSD being prevented.

It should be noted that, although case 1-1 (long PUCCH-long PUSCH simultaneous transmission) was described as an example in FIG. 15, an operation similar to that in embodiment 2 can be applied also to other cases. In other words, in a case where the PUCCH transmission interval and the PUSCH transmission interval are at least partially overlapped in a slot in which a PUCCH-PUSCH simultaneous transmission is to be carried out, it is sufficient for the terminal 200 to drop a portion of the frequency resources for the PUSCH in some or all of the PUSCH transmission interval.

Modified Example of Embodiment 2

In embodiment 2, the terminal 200, when having determined that "transmission control based on the PSD difference is required", dropped a portion of the transmission band (PRB) allocated for the PUSCH with regard to a PUSCH symbol or all PUSCH symbols in the PUSCH transmission interval overlapping with the PUCCH transmission interval within the target slot. Furthermore, at such time, the terminal 200 defines a unit (granularity) for the quantity (PRB) of the dropped frequency resources as X PRB, repeatedly calculates the PSD difference between the PUCCH and PUSCH, and actually carries out simultaneous transmission of the PUCCH and PUSCH at a stage at which the PSD difference between the PUCCH and PUSCH becomes less than or equal to the PSD permitted difference specific to the UE.

In NR, consideration is being given not only to retransmission for each transport block (TB) adopted in LTE-Advanced but also to carrying out retransmission for each of a plurality of code blocks (CB) included in a transport block. In this case, it is feasible for the terminal 200 to map a TB or CB on the basis of the unit (granularity) X at which the PUSCH transmission band (PRB) described in embodiment 2 is dropped.

Figure 17:
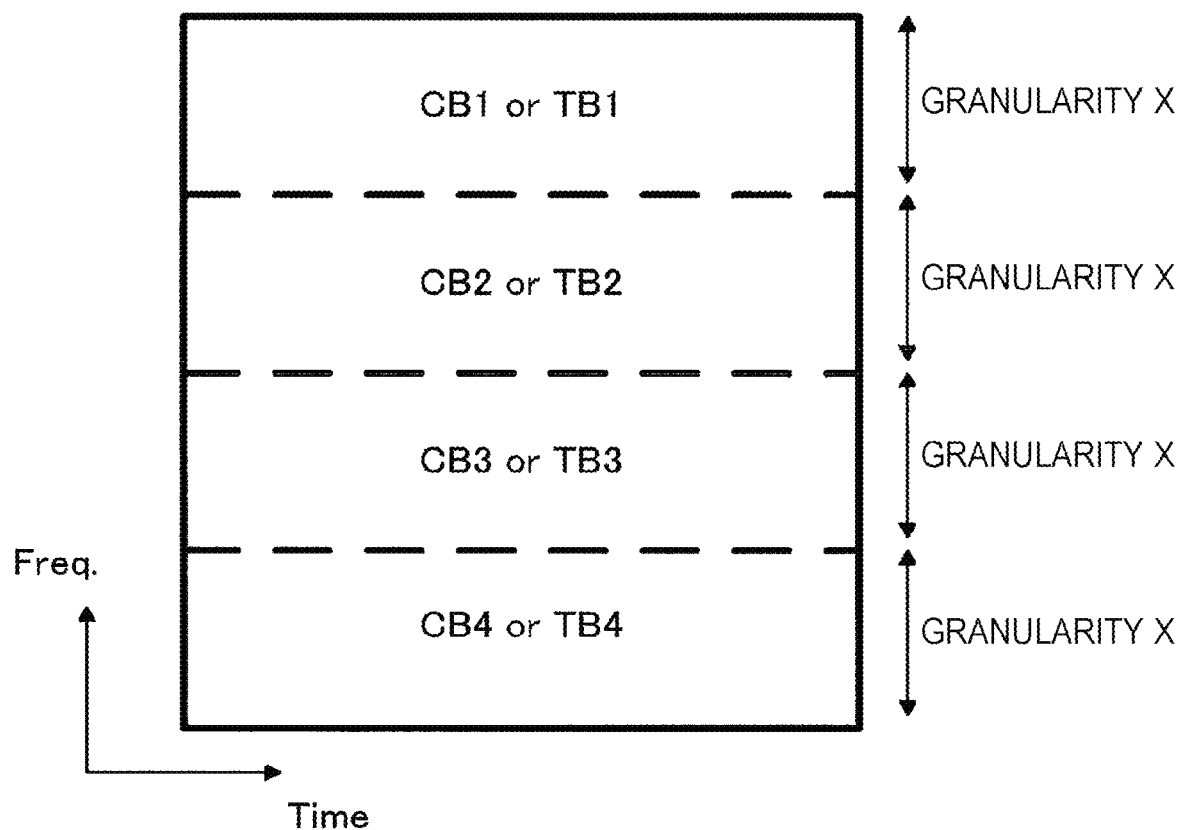
FIG. 17 depicts a mapping example for CBs or TBs according to embodiment 2.

For example, as depicted in FIG. 17, the frequency bandwidth in the TB or CB mapping may be limited to units of the unit (granularity) X at which the PUSCH transmission band (PRB) is dropped. Therefore, even in a case where the terminal 200 drops a portion of the PRBs due to the effect of the PSD difference between the PUCCH and PUSCH, it is possible to avoid all TBs or CBs being dropped. For example, in a case where the terminal 200 has dropped the frequency band for CB4 and transmitted CB1 to CB3 from among CB1 to CB4 depicted in FIG. 17, the base station 100 may retransmit CB4. That is, it is possible to reduce the quantity of CBs or TBs retransmitted by the base station 100.

It should be noted that this TB/CB mapping is not restricted to the case of a PUCCH-PUSCH simultaneous transmission, and can also be applied to a case where a plurality of channels are simultaneously transmitted by means of carrier aggregation or the like. Furthermore, there is no restriction to the simultaneous transmission of a plurality of different channels, and, even in the same channel such as a PUSCH, in a case where wide band allocation is supported in NR, a portion of the PUSCH can be dropped in order to avoid the effect of a maximum transmission power limit specific to the UE. It is therefore effective to define the unit (granularity) for the TB/CB mapping as mentioned above.

Embodiment 3

The base station and the terminal according to the present embodiment have basic configurations that are common to those of the base station 100 and the terminal 200 according to embodiment 1, and will therefore be described with reference to FIGS. 7 and 8.

In the present embodiment, the operations of the base station 100 and the terminal 200 up to power scaling being carried out are similar to those in embodiment 1. In the present embodiment, the transmission control (ST107 in FIG. 9) based on the PSD difference carried out when the terminal 200 has determined that "transmission control based on the PSD difference is required" is different from that in embodiment 1.

In embodiment 1, all of the PUSCH symbols within the target slot are dropped, for example, in a case where a PUCCH transmission interval and a PUSCH transmission interval are completely overlapped in a long PUCCH-short PUSCH simultaneous transmission (case 1-1 and case 2-1), a case where a PUCCH transmission interval and a PUSCH transmission interval are partially overlapped and the PUSCH transmission interval is shorter than the PUCCH transmission interval (case 3-1), or the like.

In this case, in PUSCH symbol detection processing in the base station 100, although there is an advantage in that it becomes easy to detect a state in which the PSD difference has become greater than the permitted difference in the terminal 200, it becomes necessary to retransmit the PUSCH signal that has been dropped.

Thus, in the present embodiment, a description will be given regarding a method for reducing the PSD difference between a PUCCH and PUSCH, while preventing all of a PUSCH transmission being dropped, even in a case where transmission control based on the PSD difference is required.

Specifically, the terminal 200 changes the PUCCH transmission format in a case where transmission control based on the PSD difference is required.

For example, in a case where the PSD difference between a PUCCH and PUSCH is greater than the PSD permitted difference specific to the UE (ST106 in FIG. 9: yes), the terminal 200 determines that "transmission control based on the PSD difference is required", and carries out transmission control based on the PSD difference described hereinafter (ST107 in FIG. 9).

In the present embodiment, the terminal 200, when having determined that "transmission control based on the PSD difference is required", alters the PUCCH transmission interval (transmission format) by means of a method described in the following option 1 or option 2 regarding the target slot.

<Option 1>

Figure 18:
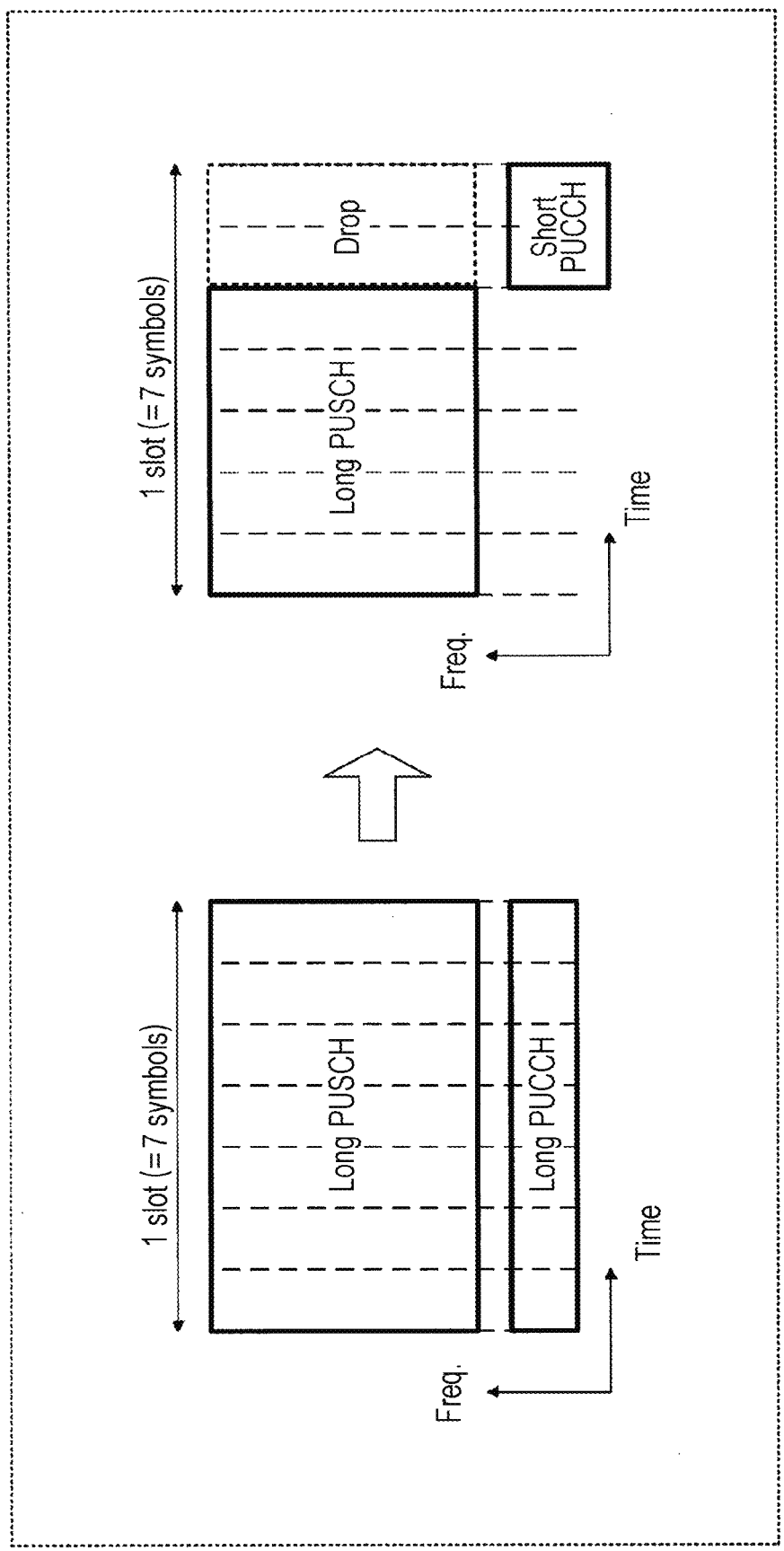
FIG. 18 depicts an example of transmission control based on the PSD difference according to embodiment 3.

In option 1, the terminal 200, when having determined that "transmission control based on the PSD difference is required" in a case where there are symbols in which a long PUCCH and a PUSCH are transmitted at the same time within the same slot (a case where a long PUCCH transmission interval and a PUSCH transmission interval are overlapped; corresponding to case 1-1, case 1-2, and case 3-1), changes the long PUCCH transmission within the target slot to a short PUCCH transmission as depicted in FIG. 18.

In addition, in option 1, after having changed the PUCCH transmission to a short PUCCH transmission similar to embodiment 1, the terminal 200 drops (does not transmit or punctures) PUSCH symbols in the PUSCH transmission interval overlapping with the short PUCCH transmission interval within the target slot, as depicted in FIG. 18.

In this way, in option 1, since the PUSCH transmission is not dropped entirely, the terminal 200 is able to suppress a decline in the transmission quality of the signal transmitted by the PUSCH by reducing the PUSCH transmission interval. It should be noted that, since the PUCCH transmission interval shortens due to the long PUCCH being changed to a short PUCCH, it is assumed that option 1 is employed in an environment in which the effect of a transmission power limit is small, for example, an environment in which the terminal 200 is positioned near a cell (base station 100).

<Option 2>

Figure 19:
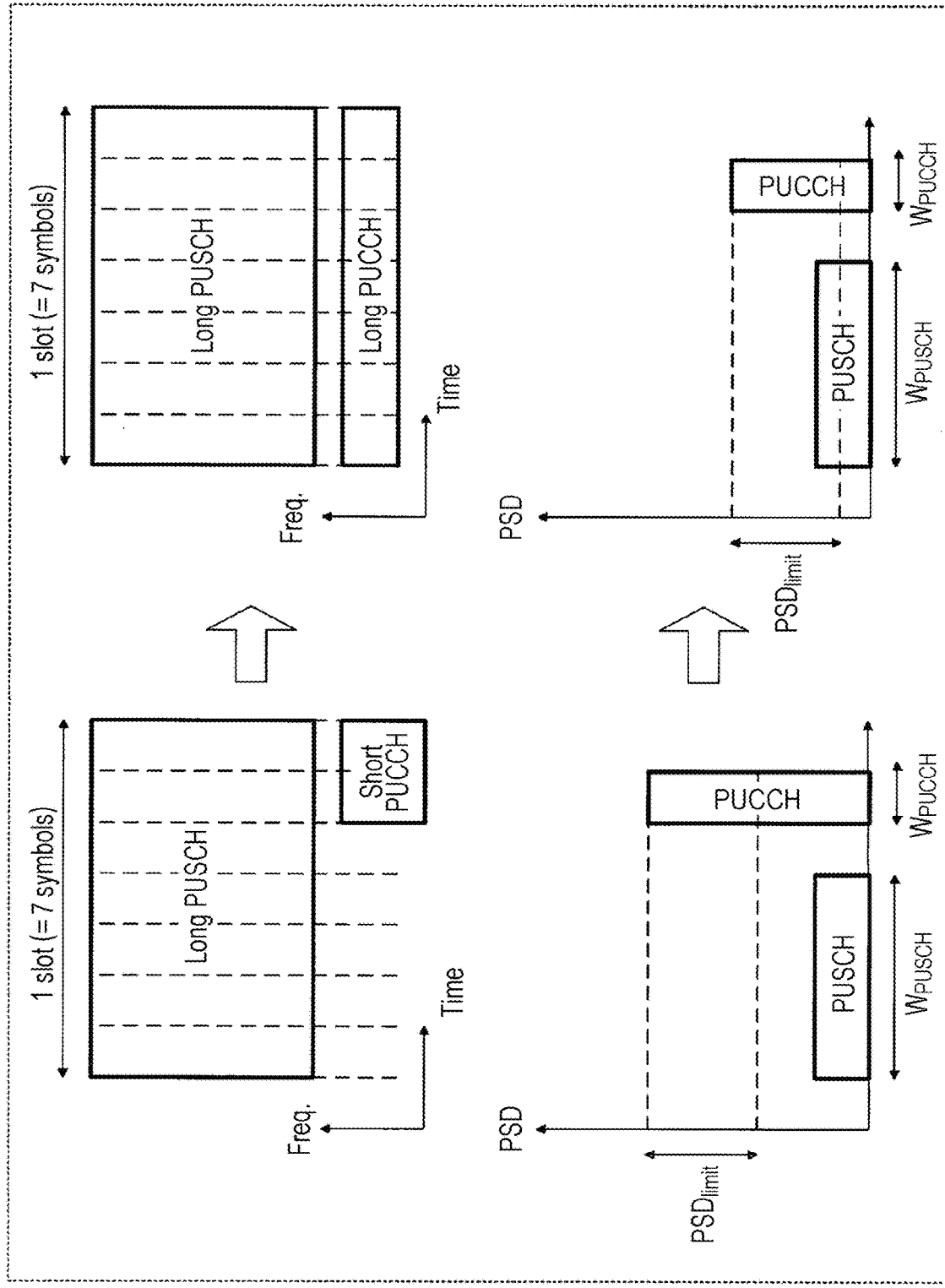
FIG. 19 depicts an example of transmission control based on the PSD difference according to embodiment 3.

In option 2, the terminal 200, when having determined that "transmission control based on the PSD difference is required" in a case where there are symbols in which a short PUCCH and a PUSCH are transmitted at the same time within the same slot (a case where a short PUCCH transmission interval and a PUSCH transmission interval are overlapped; corresponding to case 2-1, case 2-2, and case 4-1), changes the short PUCCH transmission within the target slot to a long PUCCH transmission as depicted in FIG. 19.

In addition, in option 2, the terminal 200, after having changed the short PUCCH transmission to a long PUCCH transmission, scales (reduces) the transmission power for the long PUCCH, as depicted in FIG. 19. Thus, as depicted in FIG. 19, within the target slot, the PSD difference between the PUCCH and PUSCH can be made to be less than or equal to the permitted difference ($PSD_{limit}$), and it is possible to avoid an effect on transmission quality from the PSD difference in the PUCCH-PUSCH simultaneous transmission.

It should be noted that, in option 2, since the transmission interval for the PUCCH is changed, it is possible for the transmission quality of the PUCCH to be assured even if the transmission power for the PUCCH is scaled (reduced).

Options 1 and 2 have been described hereinabove.

In this way, in the present embodiment, in a slot in which a PUCCH-PUSCH simultaneous transmission is to be carried out, the terminal 200 is able to carry out a PUCCH-PUSCH simultaneous transmission with a deterioration in transmission quality due to the permitted difference for PSD being prevented by changing the PUCCH transmission format.

Embodiment 4

The base station and the terminal according to the present embodiment have basic configurations that are common to those of the base station 100 and the terminal 200 according to embodiment 1, and will therefore be described with reference to FIGS. 7 and 8.

In power scaling method 2 described in embodiment 1 (for example, see FIG. 11), the terminal 200, when having determined that "power scaling is required", carries out power scaling with respect to PUSCH symbols superposing a PUCCH transmission interval within the target slot, and does not carry out power scaling with respect to PUSCH symbols not superposing the PUCCH transmission interval.

Here, in a case where power scaling occurs, it is necessary to provide a transition period (transient period) between symbols for which power scaling occurs and symbols for which power scaling does not occur. In this case, a deterioration in signal quality is feasible in symbols that include a transient period. In particular, the effect on signal quality deterioration from a transient period increases as the number of symbols decreases (for example, transmission of one symbol or two symbols).

Thus, in the present embodiment, the terminal 200 provides a transient period at the PUSCH transmission side in a case where power scaling occurs within the target slot, as depicted in FIG. 20.

Specifically, in FIG. 20, a PUCCH transmission interval and a PUSCH transmission interval are overlapped in the last two symbols within a slot, and power scaling occurs. Thus, it is necessary for the terminal 200 to provide a transient period between the symbol that is third from the end and the symbol that is second from the end. In this case, as depicted in FIG. 20, the terminal 200 does not provide a transient period in symbols in which the PUCCH transmission interval and the PUSCH transmission interval are overlapped, that is, symbols for which power scaling occurs, and provides a transient period in symbols in which the PUCCH transmission interval and the PUSCH transmission interval are not overlapped, that is, symbols in which there is only a PUSCH transmission interval in FIG. 20 (symbols for which power scaling does not occur).

Thus, since the transient period has no effect on the PUCCH transmission, it is possible to assure the transmission quality of the PUCCH having a smaller number of symbols, and it is possible to prevent a decline in the transmission quality of an ACK/NACK signal or the like having high priority.

Furthermore, since power scaling occurs in the PUSCH transmission in a case where the PUSCH transmission interval is long and the PUCCH transmission interval is short, and only a portion of the long PUSCH interval (a plurality of PUSCH symbols) is affected in terms of signal quality by the transient period, it is therefore possible to suppress a decline in transmission quality for the entire PUSCH.

Embodiments of the present disclosure have been described hereinabove.

It should be noted that a PHR (power headroom report) for a terminal to report surplus transmission power to a base station is supported in LTE-Advanced. Similarly, the terminal 200 is able to feed back a PHR for reporting surplus transmission power to the base station 100 also in the present embodiments mentioned above. In addition, the terminal 200 is also able to feed back information relating to a PSD difference between a PUCCH and PUSCH as a PHR to the base station 100. It becomes possible for the base station 100 to allocate appropriate transmission power and radio resources for the target terminal 200 in the subsequent slot on the basis of information relating to the PSD difference that has been fed back. Furthermore, the terminal 200 may notify the base station 100 of a PSD permitted difference ($PSD_{limit}$) specific to the UE.

Furthermore, in the aforementioned embodiments, descriptions have been given regarding cases where an ACK/NACK signal is transmitted by a PUCCH; however, the signal transmitted by a PUCCH is not restricted to an ACK/NACK signal and may be another uplink signal (for example, CSI, an SR, or the like). Furthermore, it is also possible for the channel that is dropped to be changed in accordance with the priority of the signal transmitted by a PUCCH. That is, the terminal 200, when having determined that "transmission control based on the PSD difference is required", may carry out an operation in which the symbols of a channel that transmits a low priority signal are dropped (are not transmitted or are punctured) from among symbols in which a PUCCH transmission interval and a PUSCH transmission interval within the target slot are overlapped.

Furthermore, it is possible for the present disclosure to be realized by means of software, hardware, or software in cooperation with hardware. Each functional block used in the description of the aforementioned embodiments may be partially or entirely realized as an LSI, which is an integrated circuit, and each process described in the aforementioned embodiments may be partially or entirely controlled by one LSI or a combination of LSIs. The LSIs may be configured from individual chips, or may be configured from one chip so as to include some or all of the functional blocks. The LSIs may be provided with a data input and output. The LSIs are also referred to as ICs, system LSIs, super LSIs, or ultra LSIs depending on differences in the degree of integration. The circuit integration technique is not limited to an LSI, and may be realized using a dedicated circuit, a general-purpose processor, or a dedicated processor. Furthermore, after an LSI has been manufactured, an FPGA (field-programmable gate array) that can be programmed, or a reconfigurable processor with which the connections and settings of circuit cells within the LSI can be reconfigured, may be used. The present disclosure may be realized as digital processing or analog processing. In addition, if circuit integration technology that replaces LSI appears as a result of another technology that is an advancement in semiconductor technology or is derived therefrom, naturally, the other technology may be used to carry out the integration of functional blocks. Biotechnology applications and the like are also a possibility.

A terminal of the present disclosure is provided with: a circuit that, in a slot having allocated thereto both an uplink control channel (PUCCH) and an uplink channel (PUSCH) that includes uplink data, in a case where a difference between a power spectrum density (PSD) of the PUCCH and the PSD of the PUSCH is greater than a threshold value, drops a symbol of the PUSCH in a transmission interval for the PUSCH overlapping with a transmission interval for the PUCCH; and a transmitter that transmits at least the PUCCH in the slot.

A terminal of the present disclosure is provided with: a circuit that, in a slot having allocated thereto both an uplink control channel (PUCCH) and an uplink channel (PUSCH) that includes uplink data, in a case where a difference between a power spectrum density (PSD) of the PUCCH and the PSD of the PUSCH is greater than a threshold value, drops a portion of resources of frequency resources to which the PUSCH is allocated in a transmission interval for the PUSCH overlapping a transmission interval for the PUCCH; and a transmitter that transmits the PUCCH, and the PUSCH for which the portion of a frequency band has been dropped, in the slot.

A terminal of the present disclosure is provided with: a circuit that, in a slot having allocated thereto both an uplink control channel (PUCCH) and an uplink channel (PUSCH) that includes uplink data, in a case where a difference between a power spectrum density (PSD) of the PUCCH and the PSD of the PUSCH is greater than a threshold value, changes a transmission format of the PUCCH; and a transmitter that transmits the PUCCH obtained after the transmission format has been changed, and the PUSCH, in the slot.

In a terminal of the present disclosure, in a case where the transmission interval for the PUCCH and a portion of the transmission interval for the PUSCH are overlapped, the circuit sets a transient period in an interval that does not overlap with the transmission interval for the PUCCH, within the transmission interval for the PUSCH.

In a terminal of the present disclosure, a unit (granularity) for a frequency resource quantity at which the PUSCH is dropped is defined, and a transport block or a code block included in the PUSCH is mapped to the frequency resources in the unit.

In a terminal of the present disclosure, in a case where the transmission format has been changed from a short PUCCH to a long PUCCH, the circuit carries out power scaling for the long PUCCH.

A communication method of the present disclosure includes: in a slot having allocated thereto both an uplink control channel (PUCCH) and an uplink channel (PUSCH) that includes uplink data, in a case where a difference between a power spectrum density (PSD) of the PUCCH and the PSD of the PUSCH is greater than a threshold value, dropping a symbol of the PUSCH in a transmission interval for the PUSCH overlapping with a transmission interval for the PUCCH; and transmitting at least the PUCCH in the slot.

A communication method of the present disclosure includes: in a slot having allocated thereto both an uplink control channel (PUCCH) and an uplink channel (PUSCH) that includes uplink data, in a case where a difference between a power spectrum density (PSD) of the PUCCH and the PSD of the PUSCH is greater than a threshold value, dropping a portion of resources of frequency resources to which the PUSCH is allocated in a transmission interval for the PUSCH overlapping with a transmission interval for the PUCCH; and transmitting the PUCCH, and the PUSCH for which the portion of a frequency band has been dropped, in the slot.

A communication method of the present disclosure includes: in a slot having allocated thereto both an uplink control channel (PUCCH) and an uplink channel (PUSCH) that includes uplink data, in a case where a difference between a power spectrum density (PSD) of the PUCCH and the PSD of the PUSCH is greater than a threshold value, changing a transmission format of the PUCCH; and transmitting the PUCCH obtained after the transmission format has been changed, and the PUSCH, in the slot.

An embodiment of the present disclosure is useful in a mobile communication system.

REFERENCE SIGNS LIST

100 Base station
101, 209 Control unit
102 Data generation unit
103, 107, 110, 210, 213 Encoding unit
104 Retransmission control unit
105, 108, 111, 211, 214 Modulation unit
106 High-order control signal generation unit
109 Downlink control signal generation unit
112, 215 Signal allocation unit
113, 216 IFFT unit
114, 217 Transmission unit
115, 201 Antenna
116, 202 Reception unit
117, 203 FFT unit
118, 204 Extraction unit
119 PUSCH demodulation/decoding unit
120 PUCCH demodulation/decoding unit
121 Determination unit
200 Terminal
205 Downlink control signal demodulation unit
206 High-order control signal demodulation unit
207 Downlink data signal demodulation unit
208 Error detection unit
212 ACK/NACK generation unit

The invention claimed is:

1. A terminal comprising:
a receiver, which, in operation, receives information associated with a mode where both an uplink control channel (PUCCH) and an uplink channel (PUSCH) are transmitted in a slot; and
circuitry, which, in operation, controls a transmission of the PUCCH and the PUSCH in the slot based on a difference between a power spectrum density (PSD) of the PUCCH and a PSD of the PUSCH,
wherein, in a case where a transmission interval for the PUCCH and a portion of a transmission interval for the PUSCH are superposed, the circuitry, in operation, sets a transient period in an interval that does not overlap with the transmission interval for the PUCCH, within the transmission interval for the PUSCH.

2. The terminal according to claim 1, wherein in a case where the difference is greater than a threshold value, the circuitry, in operation, drops a symbol of the PUSCH in a transmission interval for the PUSCH overlapping with a transmission interval for the PUCCH.

3. The terminal according to claim 1, wherein in a case where the difference is greater than a threshold value, the circuitry, in operation, drops a portion of resources of frequency resources to which the PUSCH is allocated in a transmission interval for the PUSCH overlapping with a transmission interval for the PUCCH.

4. The terminal according to claim 1, wherein in a case where the difference is greater than a threshold value, the circuitry, in operation, changes a transmission format of the PUCCH.

5. The terminal according to claim 3, wherein a unit for a frequency resource quantity at which the PUSCH is dropped is defined, and a transport block or a code block included in the PUSCH is mapped to frequency resources in the unit.

6. The terminal according to claim 4, wherein, in a case where the transmission format has been changed from a short PUCCH to a long PUCCH, the circuitry, in operation, carries out power scaling for the long PUCCH.

7. A communication method comprising:
   receiving information associated with a mode where both an uplink control channel (PUCCH) and an uplink channel (PUSCH) are transmitted in a slot; and
   controlling a transmission of the PUCCH and the PUSCH in the slot based on a difference between a power spectrum density (PSD) of the PUCCH and a PSD of the PUSCH,
   wherein, in a case where a transmission interval for the PUCCH and a portion of a transmission interval for the PUSCH are superposed, the controlling includes setting a transient period in an interval that does not overlap with the transmission interval for the PUCCH, within the transmission interval for the PUSCH.

8. The communication method according to claim 7, wherein in a case where the difference is greater than a threshold value, the controlling includes dropping a symbol of the PUSCH in a transmission interval for the PUSCH overlapping with a transmission interval for the PUCCH.

9. The communication method according to claim 7, wherein in a case where the difference is greater than a threshold value, the controlling includes dropping a portion of resources of frequency resources to which the PUSCH is allocated in a transmission interval for the PUSCH overlapping with a transmission interval for the PUCCH.

10. The communication method according to claim 7, wherein in a case where the difference is greater than a threshold value, controlling includes changing a transmission format of the PUCCH.

11. The communication method according to claim 9, wherein a unit for a frequency resource quantity at which the PUSCH is dropped is defined, and a transport block or a code block included in the PUSCH is mapped to frequency resources in the unit.

12. The communication method according to claim 10, wherein, in a case where the transmission format has been changed from a short PUCCH to a long PUCCH, the controlling includes carrying out power scaling for the long PUCCH.

13. A terminal comprising:
   a receiver, which, in operation, receives information associated with a mode where both an uplink control channel (PUCCH) and an uplink channel (PUSCH) are transmitted in a slot; and
   circuitry, which, in operation,
      controls a transmission of the PUCCH and the PUSCH in the slot based on a difference between a power spectrum density (PSD) of the PUCCH and a PSD of the PUSCH,
   wherein:
      in a case where the difference is greater than a threshold value, the circuitry, in operation, changes a transmission format of the PUCCH, and
      in a case where the transmission format has been changed from a short PUCCH to a long PUCCH, the circuitry, in operation, performs power scaling for the long PUCCH.

* * * * *